United States Patent
Liot et al.

(10) Patent No.: US 12,477,159 B2
(45) Date of Patent: Nov. 18, 2025

(54) CACHE-BASED CONTENT DISTRIBUTION NETWORK

(71) Applicant: SAMSUNG ELECTRONICS CO., LTD., Gyeonggi-Do (KR)

(72) Inventors: Anthony Sylvain Jean-Yves Liot, San Jose, CA (US); Anil Unnikrishnan, Dublin, CA (US); Sajid Sadi, San Jose, CA (US); Sandipan Banerjee, Boston, MA (US); Vignesh Gokul, Mountain View, CA (US); Janvi Chetan Palan, San Francisco, CA (US); Hyun Jae Kang, Mountain View, CA (US); Ondrej Texler, San Jose, CA (US)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 0 days.

(21) Appl. No.: 18/419,123

(22) Filed: Jan. 22, 2024

(65) Prior Publication Data
US 2024/0323459 A1 Sep. 26, 2024

Related U.S. Application Data

(60) Provisional application No. 63/453,825, filed on Mar. 22, 2023, provisional application No. 63/453,999, filed on Mar. 22, 2023.

(51) Int. Cl.
*H04N 21/231* (2011.01)
*H04N 21/266* (2011.01)
*H04N 21/845* (2011.01)

(52) U.S. Cl.
CPC ..... *H04N 21/23106* (2013.01); *H04N 21/266* (2013.01); *H04N 21/8455* (2013.01)

(58) Field of Classification Search
CPC .......... H04N 21/23106; H04N 21/266; H04N 21/8455
See application file for complete search history.

(56) References Cited

U.S. PATENT DOCUMENTS

| 8,705,870 B2 | 4/2014 | Wang et al. |
| 9,336,268 B1 | 5/2016 | Moudy et al. |
| (Continued) | | |

FOREIGN PATENT DOCUMENTS

| KR | 101006191 B1 | 1/2011 |
| KR | 20180070170 A | 6/2018 |
| WO | 2021074932 A1 | 4/2021 |

OTHER PUBLICATIONS

WIPO Appln. No. PCT/KR2024/002788, International Search Report, Jun. 12, 2024, 4 pg.
(Continued)

*Primary Examiner* — Mulugeta Mengesha
(74) *Attorney, Agent, or Firm* — Kevin T. Cuenot

(57) ABSTRACT

Computer-implemented content delivery includes caching a source content having a plurality of bridge points. A user event indicating an interaction with a user is received. The user event is received during playback of the source content. In response to the user event, a template is selected from a plurality of cached templates. The template corresponds to a bridge point selected from the plurality of bridge points of the source content as an exit point from the source content. In response to the user event, a bridge is dynamically generated. The bridge links the bridge point with the template. In response to the user event, a target content is selected from a plurality of cached target contents. In response to the user event, the bridge, the template, and the target content is conveyed to a device of the user for playback following the bridge point of the source content.

27 Claims, 14 Drawing Sheets

(56) References Cited

U.S. PATENT DOCUMENTS

| | | | |
|---|---|---|---|
| 10,522,143 | B2 | 12/2019 | Chandrasekaran et al. |
| 10,607,133 | B2 | 3/2020 | Li et al. |
| 11,544,886 | B2 | 1/2023 | Bendale et al. |
| 2006/0290699 | A1 | 12/2006 | Dimtrva et al. |
| 2009/0094646 | A1 | 4/2009 | Walter et al. |
| 2012/0266088 | A1* | 10/2012 | Finn ................ G06F 3/1438 715/757 |
| 2013/0230255 | A1 | 9/2013 | Wang et al. |
| 2015/0213604 | A1 | 7/2015 | Li et al. |
| 2017/0039750 | A1 | 2/2017 | Tong et al. |
| 2018/0173942 | A1 | 6/2018 | Kim et al. |
| 2019/0034483 | A1 | 1/2019 | Millius et al. |
| 2019/0141162 | A1 | 5/2019 | Bohannon et al. |
| 2019/0164327 | A1 | 5/2019 | Liu |
| 2019/0341058 | A1 | 11/2019 | Zhang et al. |
| 2020/0099634 | A1 | 3/2020 | Chou et al. |
| 2020/0195751 | A1 | 6/2020 | Grue et al. |
| 2020/0357382 | A1 | 11/2020 | Ogawa et al. |
| 2022/0174340 | A1 | 6/2022 | Lee et al. |
| 2022/0292327 | A1 | 9/2022 | Publicover et al. |
| 2022/0366193 | A1 | 11/2022 | Luo et al. |
| 2022/0374714 | A1 | 11/2022 | Nayak et al. |
| 2023/0082513 | A1* | 3/2023 | Rowley ............... H04N 5/2224 345/420 |
| 2023/0095431 | A1* | 3/2023 | Smith ............... H04N 21/8113 386/280 |
| 2023/0281258 | A1* | 9/2023 | Serletic ............... G06F 16/953 707/706 |

OTHER PUBLICATIONS

WIPO Appln. No. PCT/KR2024/002788, Written Opinion, Jun. 12, 2024, 4 pg.

WIPO Appln. No. PCT/KR2024/002736, International Search Report, Jun. 13, 2024, 3 pg.

WIPO Appln. No. PCT/KR2024/002736, Written Opinion, Jun. 13, 2024, 3 pg.

Tian, Q. et al., "A semantic feature for human motion retrieval," Computer Animation and Virtual Worlds, May 15, 2013, vol. 24, Nos. 3-4, pp. 399-407.

Hu, L. et al., "Avatar digitization from a single image for real-time rendering," ACM Transactions on Graphics (ToG), Nov. 20, 2017, vol. 36, No. 6, 1-14.

Wei, S. et al., "VR facial animation via multiview image translation," ACM Transactions on Graphics (ToG) Jul. 12, 2019, vol. 38, No. 4, 1-16.

Habermann, m. et al., "Livecap: Real-time human performance capture from monocular video," CM Transactions on Graphics (ToG) Jan. 25, 2019, vol. 38, No. 2, 1-17.

"Vicon Nexus User Guide," Vicon Motion Systems, Ltd. © 2016-2021, 307 pg.

"Vicon Tracker User Guide," Vicon Motion Systems, Ltd., © 2016-2020, 219 pg.

Dinur, E., "The Filmmaker's Guide to Visual Effects: The Art and Techniques ofVFX for Directors, Producers, Editors and Cinematographers," Routledge, Mar. 27, 2017, 206 pg. (Preview, 19 pg.).

Alexander, O. et al., "The digital Emily project: photoreal facial modeling and animation," In ACM SIGGGRAPH 2009 courses, Aug. 6, 2009, Art. 12, pp. 1-15.

"Oculus Best Practices, Ver. 310-30000-02," [online] Oculus VR, LLC © 2017, retreived from the Internet: <https://www.cs.sjtu.edu.cn/~shengbin/course/vr/misc/oculus_bestpractices.pdf>, 36 pg.

Osipa, J., "Stop staring: facial modeling and animation done right," [online] John Wiley & Sons, Oct. 25, 2010, retrieved from the Internet: <https://dl.acm.org/doi/abs/10.5555/1941669>, Abstract and Preview, 11 pg.

Allen, E. et al., "Body language : guide books," [online] John Wiley & Sons, Mar. 31, 2011, retrieved from the Internet: <https://dl.acm.org/doi/abs/10.5555/1386548>, Abstract and Preview, 14 pg.

Brinkmann, R., "The art and science of digital compositing: Techniques for visual effects, animation and motion graphics," [online] Morgan Kaufmann, May 24, 2008, retrieved from the Internet: <https://shop.elsevier.com/books/the-art-and-science-of-digital-composit . . . https://shop.elsevier.com/books/the-art-and-science-of-digital-composit . . . >, Abstract and Preview, 11 pg.

Raju, P., "Character Rigging and Advance Animation," [online] Apress, 2019, retrieved from the Internet: <<https://dl.acm.org/doi/abs/10.5555/3379066>, Astract and Preview, 5 pg.

"itSeez3D mobile app," [online] itSeez3D.com, Sep. 4, 2017 [retrieved Jan. 22, 2024], retrieved from the Internet: <https://web.archive.org/web/20170904225009/https://itseez3d.com/>, 5 pg.

"Loom.ai," [online] Loom.ai © 2020 [retrieved Jan. 22, 2024] retrieved from the Internet: <https://web.archive.org/web/20200107014815/https://loomai.com/>, 3 pg.

"Avatar Web API v1.0 and beta Unity plugin released!" [online] itSeez3d.com blog, Jun. 7, 2017, retrieved from the Internet: <https://itseez3d.com/blog/avatar-web-api-v1-0-and-beta-unity-plugin-re . . . >, 3 pg.

* cited by examiner

FIG. 13

CACHE-BASED CONTENT DISTRIBUTION NETWORK

CROSS-REFERENCE TO RELATED APPLICATIONS

This application claims the benefit of U.S. Application No. 63/453,825 filed on Mar. 22, 2023, which is fully incorporated herein by reference. This application also claims the benefit of U.S. Application No. 63/453,999 filed on Mar. 22, 2023, which is fully incorporated herein by reference.

RESERVATION OF RIGHTS IN COPYRIGHTED MATERIAL

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

This disclosure relates to content distribution networks and, more particularly, to cache-based content distribution networks.

BACKGROUND

Content distribution networks refer to a class of computer-based or computer-implemented systems capable of conveying content to end user devices. Content is delivered from the content distribution network over a network or other communication link to one or more devices of users. Content refers to any of a variety of different types of media that may be conveyed via a communication network and/or other communication link(s). Examples of content include visual material (e.g., video), audible material (e.g., audio), and/or both (e.g., audiovisual material such as video that includes synchronized audio).

Some content distribution networks are capable of conveying content that is dynamically generated. Dynamically generated content is content that is generated "on-demand" in response to some request, event, or condition received or detected by the content distribution network. Dynamically generated content also may be referred to as being generated "on-the-fly" or in "real-time." Once generated, the content may be delivered to the device of a user.

Often, dynamically generated content is generated using sophisticated and computationally expensive computing techniques. These computing techniques require significant computational resources and time. As an illustrative example, content may be dynamically generated using a generative artificial intelligence (AI) system. The cost of inference (e.g., runtime operation of the system to generate content once trained) is typically quite high. Taking a particular example, dynamically generating lifelike avatars referred to as "digital humans" has a high computational cost. Generating a digital human involves, among other things, modeling motion of the digital human, synthesizing audio for the digital human, rendering video of the digital human, and synchronizing the audio and video as generated. The inference process may involve multiple deep learning models as each of the aforementioned tasks may be performed by one or more constituent deep learning models of the larger content distribution network. Each constituent deep learning model requires computing resources and time thereby adding latency to the operation and the response time of the overall network. These characteristics and technical challenges make scaling a content distribution network for use by tens of thousands of users or even millions of users difficult if not infeasible.

SUMMARY

In one or more embodiments, a computer-implemented method of content delivery is disclosed. The method includes caching a source content having a plurality of bridge points. The method includes receiving a user event indicating an interaction with a user. The user event is received during playback of the source content. In response to the user event, the method includes selecting a template from a plurality of cached templates. The template corresponds to a bridge point selected from the plurality of bridge points of the source content as an exit point from the source content. In response to the user event, the method includes dynamically generating a bridge linking the bridge point with the template. In response to the user event, the method includes selecting a target content from a plurality of cached target contents. In response to the user event, the method includes conveying the bridge, the template, and the target content to a device of the user for playback following the bridge point of the source content.

In one or more embodiments a system, apparatus, or device includes a processor configured to perform operations. The operations include caching a source content having a plurality of bridge points. The operations include receiving a user event indicating an interaction with a user. The user event is received during playback of the source content. In response to the user event, the operations include selecting a template from a plurality of cached templates. The template corresponds to a bridge point selected from the plurality of bridge points of the source content as an exit point from the source content. In response to the user event, the operations include dynamically generating a bridge linking the bridge point with the template. In response to the user event, the operations include selecting a target content from a plurality of cached target contents. In response to the user event, the operations include conveying the bridge, the template, and the target content to a device of the user for playback following the bridge point of the source content.

In one or more embodiments, a computer program product includes a computer readable storage medium having program code stored thereon. The program code is executable by a processor to perform operations. The operations include caching a source content having a plurality of bridge points. The operations include receiving a user event indicating an interaction with a user. The user event is received during playback of the source content. In response to the user event, the operations include selecting a template from a plurality of cached templates. The template corresponds to a bridge point selected from the plurality of bridge points of the source content as an exit point from the source content. In response to the user event, the operations include dynamically generating a bridge linking the bridge point with the template. In response to the user event, the operations include selecting a target content from a plurality of cached target contents. In response to the user event, the operations include conveying the bridge, the template, and the target content to a device of the user for playback following the bridge point of the source content.

In one or more embodiments, an apparatus includes an interface configured to receive a user event from a device of a user and convey content to the device in response to the user event. The apparatus includes one or more storage devices configured to store a source content including a plurality of bridge points, a plurality of templates, a plurality of target contents, and a plurality of template segments. The apparatus includes a template selector configured to choose a selected template from the plurality of templates based on a selected bridge point chosen from the plurality of bridge points of the source content. The apparatus includes a target content selector configured to choose a selected target content from the plurality of target contents based on the user event. The apparatus includes a rendering engine configured to dynamically generate a bridge linking the selected bridge point of the source content with the selected template. The interface is configured to convey the bridge, the selected template, a template segment selected from the plurality of template segments that is associated with the selected template, and the selected target content to the device of the user for playback following the selected bridge point of the source content.

This Summary section is provided merely to introduce certain concepts and not to identify any key or essential features of the claimed subject matter. Many other features and embodiments of the disclosed technology will be apparent from the accompanying drawings and from the following detailed description.

BRIEF DESCRIPTION OF THE DRAWINGS

The accompanying drawings show one or more embodiments; however, the accompanying drawings should not be taken to limit the disclosed technology to only the embodiments shown. Various aspects and advantages will become apparent upon review of the following detailed description and upon reference to the drawings.

FIG. 13 illustrates an example implementation in which the CDN is used in the context of chat support.

DETAILED DESCRIPTION

Figure 1:
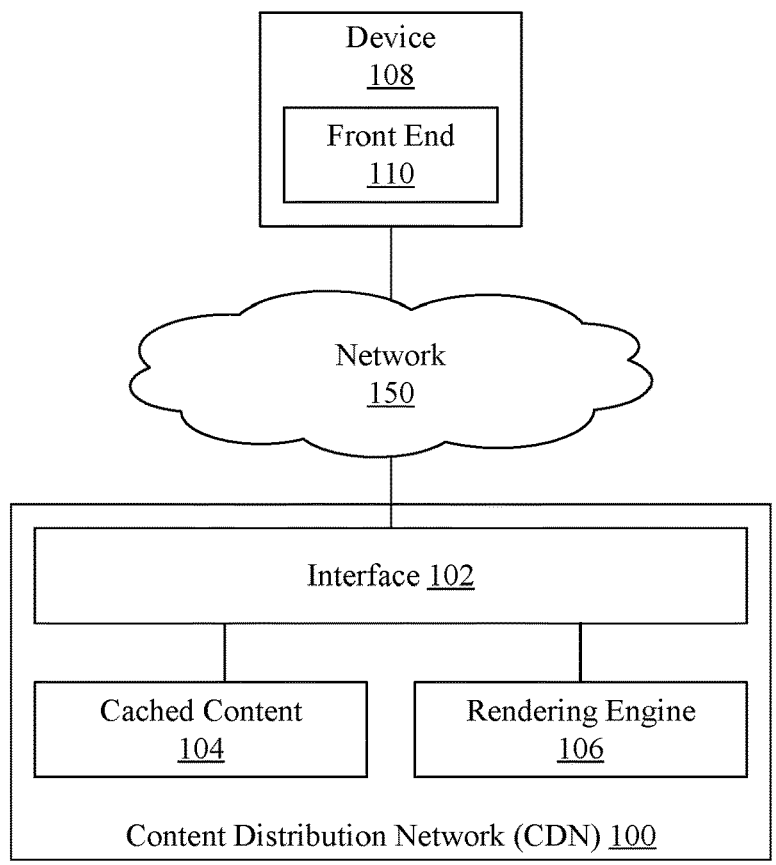
FIG. 1 illustrates an example of a content distribution network (CDN) in communication with one or more user devices.

While the disclosure concludes with claims defining novel features, it is believed that the various features described herein will be better understood from a consideration of the description in conjunction with the drawings. The process(es), machine(s), manufacture(s) and any variations thereof described within this disclosure are provided for purposes of illustration. Any specific structural and functional details described are not to be interpreted as limiting, but merely as a basis for the claims and as a representative basis for teaching one skilled in the art to variously employ the features described in virtually any appropriately detailed structure. Further, the terms and phrases used within this disclosure are not intended to be limiting, but rather to provide an understandable description of the features described.

This disclosure relates to content delivery systems and, more particularly, to cache-based content delivery systems. Synthetic media generation is becoming increasingly popular for a variety of reasons. These reasons include, but are not limited to, the use of virtual humans in the metaverse becoming increasingly important and gaining more attention from users, the increasing adoption by users of virtual experiences from remote settings, and recent advances in hardware and technology, e.g., deep neural networks, that facilitate rapid generation of such media (e.g., content).

Accordingly, methods, systems, and computer program products are provided that implement a cache-based content distribution system (CDN). The inventive arrangements are capable of playing different portions of cached content. The different portions of cached content may include source content and one or more items of target content that may be alternatingly played. Responses provided by a CDN are also referred to as "target content" within this disclosure. In playing both types of cached content, the inventive arrangements are capable of dynamically generating further content referred to herein as "bridges" that link the source content with the target content so that the user perceives a smooth transition between the source content and the target content as played on a device, apparatus, or system.

In one aspect, a CDN is capable of caching a source content including a plurality of bridge points. The CDN receives a user event during playback of the source content. In response to the user event, the CDN selects a template from a plurality of cached templates. The template corresponds to a bridge point selected from the plurality of bridge points of the source content. The bridge point is designated or selected as an exit point from the source content. The CDN is capable of dynamically generating a bridge linking the bridge point with the template. The CDN is also capable of selecting a target content from a plurality of cached target contents. The CDN conveys the bridge, the template, and the target content to a device of the user for playback following the bridge point.

A general technical effect is that the CDN is capable of providing both dynamically generated and cached content to users. For example, the CDN is capable of using a database of pre-generated interactions. In using cache-based systems, maintaining an illusion of real-time interaction between the user and the content delivered from the CDN is difficult. Accordingly, another technical effect of the inventive arrangements is the preservation or maintenance of realism and the illusion of real-time interaction between the CDN (and/or any content provided from the CDN such as a digital human) and a user despite the CDN being a cache-based system.

In one or more embodiments, a digital human is a computer-generated entity that is rendered visually with a human-like appearance. The digital human may be an avatar. In some embodiments, a digital human is a photorealistic avatar. In some embodiments, a digital human is a digital rendering of a hominid, a humanoid, a human, or other human-like character. A digital human may be an artificial human. A digital human can include elements of artificial intelligence (AI) for interpreting user input and responding to the input in a contextually appropriate manner. The digital human can interact with a user using verbal and/or non-verbal cues. Implementing natural language processing (NLP), a chatbot, and/or other software, the digital human can be configured to provide human-like interactions with a human being and/or perform activities such as scheduling, initiating, terminating, and/or monitoring of the operations of various systems and devices.

In one or more embodiments, a digital human is a computer-generated entity that is rendered visually with a human-like appearance. The digital human may be an avatar. A digital human may be an artificial human. A digital human can include elements of artificial intelligence (AI) for interpreting user input and responding to the input in a contextually appropriate manner. The digital human can interact with a user using verbal and/or non-verbal cues. Implementing natural language processing (NLP), a chatbot, and/or other software, the digital human can be configured to provide human-like interactions with a human being and/or perform activities such as scheduling, initiating, terminating, and/or monitoring of the operations of various systems and devices.

The dynamically generated and cached content may be provided to one or more users as part of an interactive dialog conducted with the user(s). Caching portions of content such as the source content and the target content reduces the computational requirements and the latency typically encountered when delivering dynamically generated content to the user. Reduction in computational requirements and latency enables the CDN to interact with a user in real-time without undue delays. The CDN, for example, may engage with a user in a two-way interaction (e.g., a dialog) in real-time. In addition, the CDS may be scaled up to interact with a larger number of users in real-time without latency or with reduced latency.

By dynamically generating bridges that link cached portions of content, the amount of inferencing operations are reduced compared to cases where the bridge in addition to one or both of the source content and/or target content must be dynamically generated. Dynamic generation of each such item of content would likely introduce latency into the CDN and hinder interaction with users. This would break any illusion of real-time operation. In addition, the dynamic generation of the bridges allows the CDN to provide content that seamlessly transitions from one portion of cached content to another. Appreciably, same or similar techniques may be implemented to operate in the reverse order to transition from the target content back to the source content in a seamless manner.

In one or more example implementations, the content that is cached (e.g., the source content and/or target content(s)), may be content that is frequently used. Once content is generated in a dynamic manner, e.g., a digital human responding to a particular user query, that content may be stored or cached in the CDN for later use. That is, the inventive arrangements are capable of dynamically generating responses to previously unseen user queries. Once generated, the responses (e.g., further target contents) may be cached with other target content for subsequent re-use by the CDN.

In one or more embodiments, the CDN is capable of selecting a template segment associated with the template from a plurality of cached template segments. The template segment associated with the template links the template with a start of the target content and the template segment is played to the device for playback following the template and before the target content. For example, the CDN is capable of dynamically generating a bridge that links a bridge point in the source content with a template. The template may serve as an anchor point from which a template segment is selected. Each template may be correlated with a particular template segment such that the selection of a template also selects a particular template segment. The template segment specifies the content that seamlessly connects the template to the target content. A technical effect of using templates and template segments is the further reduction in the amount of content to be dynamically generated to move between the source content and the target content. Further, the use of a template allows the CDN to generate more realistic, visually interesting, and natural sequences as opposed to generating a bridge that would directly link the source content with the target content.

In one or more embodiments, the CDS is capable of applying heuristics that place an upper limit on a number of bridges or the amount of content that is dynamically generated while still preserving or maintaining the illusion of diversity in the content (e.g., motion of a digital human). As an example, a finite number of template segments may be pre-generated and cached in the CDN. With sufficient template segments stored, the reliance on compute and/or inference is further minimized such that the CDN largely operates to rank, retrieve, and deliver content relevant to the user event.

In one or more embodiments, the CDN is capable of dynamically generating a further bridge linking the template with a start of the template segment based on a metric indicating an amount of dissimilarity between the template and the start of the template segment exceeds a threshold amount of dissimilarity. In some cases, depending on the type of content being delivered by the CDN, the template may not perfectly match with a start of the corresponding template segment. In such cases, the CDN is capable of generating a further bridge that links the template with the corresponding template segment.

A technical effect of the further bridge and generation thereof is the ability to adapt and/or use the CDN for a variety of different types of content. As an illustrative and non-limiting example, in the case where the CDN generates digital humans, some digital human identities have templates that consistently match with the corresponding starts of the template segments while other digital human identities do not. The further bridge generation allows the same CDN to be operable across or used for a variety of different digital human identities and/or other content types.

In one or more embodiments, the CDN selects the template from a plurality of cached templates based on a metric indicating dissimilarity between the selected bridge point and the template. In the case where the content is or includes visual content (e.g., images and/or video), the metric may be calculated to specify the dissimilarity between an image frame of the bridge point and an image frame of the template. In the case where the content is or includes audio, the metric is calculated to specify the dissimilarity between audio information of the bridge point and audio information of the template. In cases where the content is or includes both visual content and audio, the metric(s) may account for dissimilarity of the visual content as described as well as dissimilarity in audio information as described.

In one or more embodiments, the template selected from the plurality of cached templates has a lowest metric of each other template of the plurality of cached templates. That is, the template selected is the least dissimilar when compared with the selected bridge point, or the most similar to the selected bridge point. Use of a dissimilarity metric allows the CDN to reliably generate more natural and shorter bridges. This can further reduce the computational burden of inference. For example, in one or more embodiments, a length of the bridge depends on a degree of the dissimilarity between the selected bridge point and the template. In one or more embodiments, the selected bridge point is a next bridge point in time from a playback position in the source content at a time of the user event.

Further aspects of the inventive arrangements are described below in greater detail with reference to the figures. For purposes of simplicity and clarity of illustration, elements shown in the figures are not necessarily drawn to scale. For example, the dimensions of some of the elements may be exaggerated relative to other elements for clarity. Further, where considered appropriate, reference numbers are repeated among the figures to indicate corresponding, analogous, or like features.

FIG. 1 illustrates an example of a CDN 100 in communication with one or more user devices. In one or more embodiments, CDN 100 is configured as a fully interactive, cached, and scalable system for two-way interaction with one or more users. In one or more of the examples described herein, CDN 100 is capable of interacting by way of content that is or includes a form of synthetic media such as digital humans.

For purposes of illustration, consider an example in which a user has a mobile phone application or a Web-based application executing therein that is configured to function as a front-end of an interactive dialog system. The user interacts, e.g., queries or asks questions through the application and receives responses from the CDN 100 as a continuous video stream, audio stream, and/or audio-visual stream of digital media. The digital human may be specified by the continuous media stream to say the response. The application communicates with an Application Programming Interface (API) of the CDN 100, which may execute on one or more interconnected servers, whether cloud-based or other servers or computing environments. The API of CDN 100 is capable of continuously listening to the requests/interactions from the user's device and continuously send media as a stream back to the user's device for consumption, e.g., playback of the media stream, by the user.

For example, the API is capable of streaming back cached sentences obtained either from a cache storage that stores pre-generated media segments (e.g., chunks). If there is a need to transition to a different cached sentence (e.g., a different pre-generated media segment) based on the user's interactions, the API obtains or dynamically generates the needed transitional segment. The dynamically generated segment links the end of the "previous" cached segment (e.g., sentence) with the "beginning" of the next cached segment (e.g., sentence). The API further is capable of sequencing the returned media segments so that the media segments seamlessly connect the two cached segments when played on the user's device.

In FIG. 1, an example of an executable framework for CDN 100 is illustrated. The framework, as illustrated, may be executed by one or more interconnected data processing systems (e.g., computers) forming CDN 100. For example, the framework of CDN 100 may be executed by one or more interconnected servers. As defined herein, the term "server" means a data processing system configured to share services with one or more other data processing systems. An example of a data processing system that is suitable for executing the framework of CDN 100 is described in connection with FIG. 16. The example of FIG. 1 illustrates a simplified architecture of the executable framework of CDN 100 for purposes of discussion. For case of discussion, the term "CDN" is used to refer to the combination of the executable framework and the hardware on which the executable framework executes. In the example, CDN 100 includes an interface 102, cached content 104, and a rendering engine 106.

CDN 100 is coupled to network 150. Network 150 may be implemented as or include any combination of the Internet, a mobile network, a Local Area Network (LAN), a Wide Area Network (WAN), a personal area network (PAN), one or more wired networks, one or more wireless networks, or the like. Network 150 may include copper transmission cables, optical transmission fibers, wireless transmission, routers, firewalls, switches, gateway computers and/or edge devices including edge servers. The various devices and/or systems illustrated in FIG. 1 may include respective network adapters or network interfaces in order to communicate over network 150.

Device 108 is also coupled to network 150 and is capable of communicating with CDN 100 via network 150. Examples of device 108 include, but are not limited to, any of a variety of user devices. Examples of user devices may include, but are not limited to, a workstation, a desktop computer, a computer terminal, a mobile computer, a laptop computer, a netbook computer, a tablet computer, a smart phone, a personal digital assistant, a smart watch, smart glasses, a gaming device, a set-top box, a smart television, information appliance, IoT device, or the like. In another example, device 108 may be a kiosk, a kiosk configured with a video display and/or audio capabilities, or other computing or information appliance that may be positioned so as to be accessible by a plurality of different users over time.

In one or more embodiments, device 108 may be implemented as a client device. As defined herein, the term "client device" means a data processing system that requests shared services from a server, and with which a user directly interacts. Network infrastructure, such as routers, firewalls, switches, access points and the like, are not client devices as the term "client device" is defined herein.

In the example, device 108 includes a front end 110. Front end 110 may be implemented as an application, program, or other program code. In one aspect, front end 110 may be a program that is executed locally in device 108. Another example implementation of front end 110 includes a browser executing a Web page that is configured to implement the various functions described herein attributable to device 108.

In operation, a user may access device 108 and front end 110. For example, the user may establish a communication session with CDN 100 using device 108. Interface 102 is capable of implementing the API described herein. Interface 102 is capable of receiving user events and sending content, whether cached content and/or dynamically generated content, to device 108. In the example, interface 102 may receive a request from device 108. In establishing the communication session, CDN 100 may play cached content 104 to device 108. Interface 102 also may play content that is dynamically generated by rendering engine 106. In one or more examples, interface 102 plays a source content from cached content 104, and in response to a query from device 108, e.g., a user event, selects target content from cached content 104 to play to device 108. In doing so, CDN 100 dynamically generates content, e.g., a bridge, that is played between the portion of source content and the portion of target content so that the user of device 108 perceives a smooth and continuous playback of different portions of cached content 104 without visual or audible artifacts.

In the examples described herein, CDN 100 is capable of playing content by conveying streams of content (e.g., audio, video, and/or video with synchronized audio) from interface 102 over network 150 to device 108. In response to receiving content from CDN 100, device 108 is capable of playing the content (e.g., via a display and/or through a transducer such as a speaker).

Figure 2:
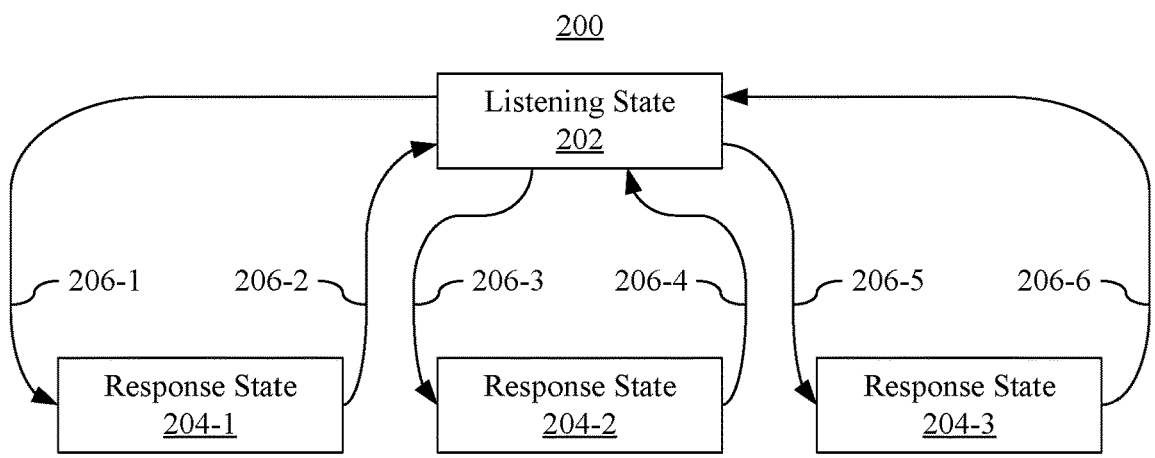
FIG. 2 illustrates an example of a state machine implemented by the CDN of FIG. 1.

FIG. 2 illustrates an example of a state machine 200 implemented by CDN 100 of FIG. 1. In the example of FIG. 2, CDN 100 is operative to create an illusion of realism and interactivity. As shown, state machine 200, which may be expressed in graph form, has a plurality of states that may be traversed. In the example, state machine 200 includes a central node called listening state 202. In listening state 202, CDN 100 is capable of playing source content while CDN 100 listens while waiting for interaction with a user (e.g., a user input). In response to the user asking a question or interacting with CDN 100 in another way (e.g., a user event being received), CDN 100 moves from listening state 202 to a corresponding response state 204 (e.g., 204-1, 204-2, and 204-3). After the corresponding response state 204, CDN 100 loops back to listening state 202.

In one or more embodiments, CDN 100 is capable of looping in listening state 202. CDN 100 may also convey cached data in the various response states 204 to provide responses to specific questions from the user. To be able to create an illusion of interactivity and to make the user believe that CDN 100 is interacting with the user live in real-time or on-demand, even though in this case CDN 100 is playing pre-generated or cached responses sequentially, CDN 100 is capable of mimicking aspects of the interaction.

In the example, listening state 202 corresponds to source content that may be infinitely traversable. The source content played by CDN 100 while in listening state 202 can be generated offline and stored as cached content 104. For example, the source content may be rendered Red, Green, Blue (RGB) image frames; contour(s) and/or keypoints that can be rendered as RGB image frames; video including synchronized audio; audio (e.g., audio only); or the like. The particular type of source content that is stored and played while in listening state 202 depends on the particular domain in which CDN 100 is used. Response states 204 correspond to different versions of target content that can be played in response to particular user queries. The target contents played in the different respective response states 204 are also examples of cached content 104. The target contents may be stored as RGB frames, contour(s) and keypoints, audio (audio only), video including synchronized audio, etc., depending on the domain. In one or more embodiments, each item of target content may begin with a particular start, e.g., a particular frame, and can reliably be generated offline with a guarantee that the target content will start with that same start frame as requested. The set of starts may be of finite length.

In the example, CDN 100 is operating in listening state 202. While in listening state 202, CDN 100 plays source content to device 108. In one aspect, CDN 100 plays the source content in a loop or continuously while in listening state 202. CDN 100 may continue to play source content until a user event is received or detected from device 108. In response to the user event, CDN 100 transitions to a response state 204. CDN 100, for example, interrupts the playing or playback of the source content and branches to play target content corresponding to the particular response state 204 that is visited. As noted, the source content and the target content are examples of cached content 104.

To play particular target content corresponding to a response state 204, CDN 100 generates a bridge 206 (illustrated as branches in FIG. 2 corresponding to bridges 206-1, 206-2, 206-3, 206-4, 206-5, and 206-6). Each bridge 206 is dynamically generated by rendering engine 106 in an on-demand manner. For example, in response to the user event, CDN 100 determines which response state 204 matches the received user query (e.g., the user event) and selects that response state. For purposes of illustration, consider an example where device 108 and front end 110 are implemented as a kiosk in a large store and the user query is a request for directions to a particular location or department in the store. In this example, response state 204-2 corresponds to a cached item of target content that specifies the directions sought by the user. CDN 100 selects response state 204-2 and enters that state.

Continuing with the example, to traverse to response state 204-2, rendering engine 106 dynamically generates bridge 206-3. Rendering engine 106 may also dynamically generate bridge 206-4. CDN 100, via interface 102, conveys bridge 206-3 to the user followed by the item of target content for response state 204-2. At the conclusion of the target content, CDN 100 transitions back to listening state 202 by conveying bridge 206-4 via interface 102 to device 108. Following the conveyance of bridge 206-4, CDN 100 is back in listening state 202 and may play or continue playing the source content. CDN 100 may continue playing the source content until a further user event is received. In the example, the content played by CDN 100 is delivered through network 150 for playback via front end 110 of device 108.

Figure 3:
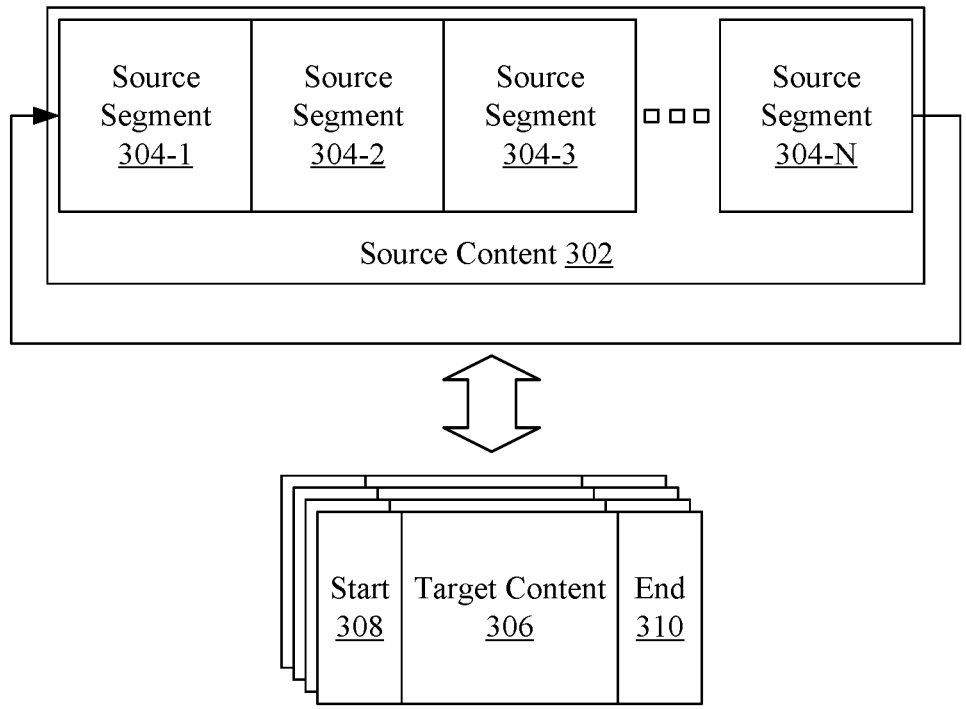
FIG. 3 illustrates certain operative features of the CDN of FIG. 1.

FIG. 3 illustrates certain operative features of CDN 100. The example of FIG. 3 illustrates source content 302. Source content 302 is shown as a plurality of source segments 304 (e.g., source segments 304-1, 304-2, 304-3, . . . , 304-N). Source segments 304 may be ordered. For purposes of illustration, source segments 304 may be portions or regions of a video, audio, or audiovisual media. CDN 100 may play source segments 304 as ordered in a loop while in listening state 202. In one or more embodiments, source content 302 may be a loop of a digital human. Source content 302 may be a loop of the digital human in a wait or a listening state in which the digital human appears to be waiting to engage a user in an interactive dialog. Within this disclosure the term "play" is used from time-to-time in reference to CDN 100 (e.g., interface 102) conveying a media stream to a device.

In the example of FIG. 3, each target content 306 of a plurality of such target contents may have a start 308 and an end 310. In an example, start 308 may be a first frame of target content 306. End 310 may be a last frame of target content 306. In the case of visual material, start 308 and end 310 each may be an image frame. In another example, where the target content 306 is audio, start 308 and end 310 include or specify audio information. For purposes illustration, the audio information may be samples of digital audio with start 308 being a first sample of target content 306 and end 310 being a last sample of target content 306. In still other examples, start 308 and end 310 may include both an image frame and audio information (e.g., samples).

In general, in generating bridges 206, rendering engine 106 dynamically generates content that links exit points within source content 302 with starts 308 of target contents 306. Similarly, rendering engine 106 may dynamically generate bridges 206 that link ends 310 with entry points back into source content 302. In one or more embodiments described in greater detail hereinbelow, rendering engine 106 may use one or more interpolation techniques to generate or render the bridge(s) 206.

Figure 4:
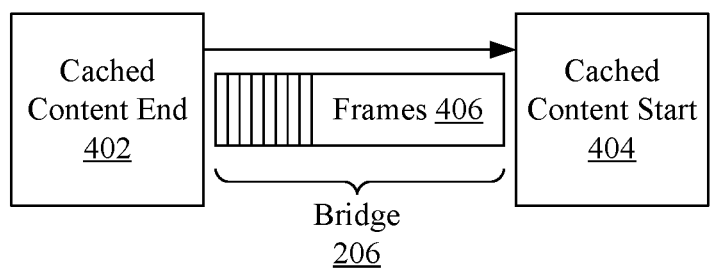
FIG. 4 illustrates dynamic generation of a bridge linking two portions of cached content.

FIG. 4 illustrates the dynamic generation of a bridge 206 linking two portions of cached content 104. In the example, rendering engine 106 generates one or more frames 406 that link an end of cached content (cached content end 402) with a start of other cached content (cached content start 404). In one aspect, cached content end 402 represents an exit point of source content 302 while cached content start 404 represents start 308 of a selected target content 306. In another aspect, cached content end 402 represents end 310 of the selected target content 306 and cached content start 404 represents an entry point into source content 302.

Figure 5:
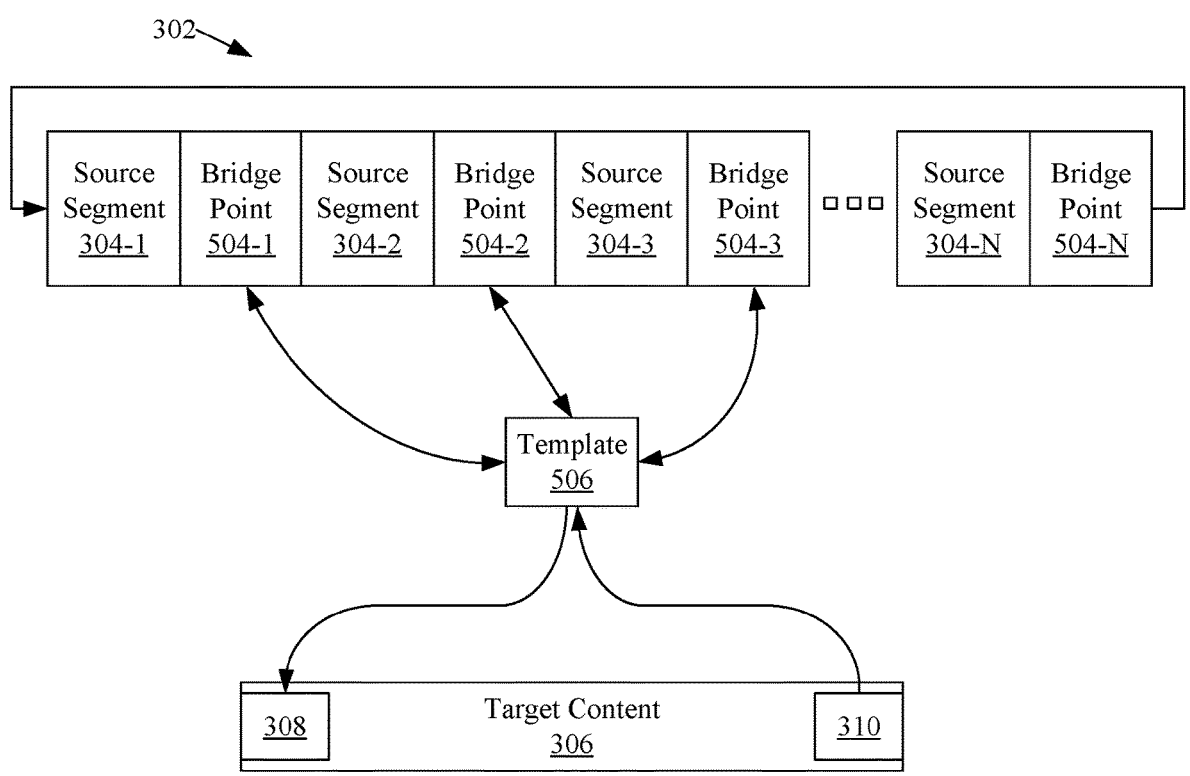
FIG. 5 illustrates an example transition between source content and target content in accordance with one or more embodiments of the disclosed technology.

FIG. 5. illustrates an example transition between source content 302 and target content 306 in accordance with one or more embodiments of the disclosed technology. In the example of FIG. 5, source content 302 is shown as being formed of source segments 304 and bridge points 504 (e.g., bridge points 504-1, 504-2, 504-3, . . . , 504-N). While in listening state 202, CDN 100 is capable of cycling through source segments 304. Once the last source segment 304 is reached or played, CDN 100 loops back to start playing source content 302 from the beginning. In the example of FIG. 5, once source segment 304-4 is played, CDN 100 is capable of cycling back to play source segment 304-1. This behavior provides a seamless and infinite loop.

In the example, bridge points 504 separate or mark the different source segments 304 that form source content 302. In other words, different points within source content 302 are selected as bridge points 504. Each bridge point 504 is a particular item of source content 302 that defines or marks a particular point in time within source content 302. Source segments 304 may include the frames of source content 302 that are not designated as bridge points 504. In one or more embodiments, source segments 304 may be separate segments of content (e.g., separate files) played between consecutive bridge points 504.

Bridge points 504 serve as exit points when transitioning from source content 302 (listening state 202) to target content 306 (response state 204). Bridge points 504 also serve as entry points when transitioning from target content 306 (response state 204) to source content 302 (listening state 202). In one or more embodiments, bridge points 504 are predetermined points within source content 302. Bridge points 504 may be selected or chosen at preset or fixed intervals within source content 302. Each bridge point 504 is a predetermined location within source content 302. For example, bridge points 504 may be spaced at playback distances of fractions of a second, e.g., every ¼, ½, or ¾ of a second, or at playback distances of N seconds (e.g., every 1, 2, 3, or more seconds), or at playback distances of some combination of N seconds and a fractional second. In one or more embodiments, a bridge point is a frame of source content 302.

Within this disclosure, the term "frame" refers to a particular item of content. In the case of visual content or media, a frame is an image frame. Examples of an image frame include, but are not limited to, an RGB image, a set of keypoints, a contour map, or a contour map including one or more keypoints. In the case of audio content or media, a frame may be a sample. In the case of audiovisual material, a frame may be a particular image frame and a sample of audio both intended to be played or rendered simultaneously (e.g., at a same time so as to be synchronized during playback).

Template 506 is a single frame. CDN 100 may store a plurality of different templates that may be selected when transitioning from source content 302 to target content 306. The templates and the selection of templates are described in greater detail hereinbelow. For purposes of illustration, consider the case where source content 302 is playing in a loop awaiting a user interaction. As a user begins to interact with CDN 100 and poses a question (e.g., a query), a user event is generated by front end 110. In one or more example implementations, CDN 100 is capable of selecting the next bridge point in time while source content 302 is playing back. For example, if source segment 304-1 is playing back while the user event is detected or received, CDN 100 is capable of selecting bridge point 504-1, which is the next bridge point 504 in time from the playback position within source content 302 corresponding to a time of the user event. In another example, CDN 100 is capable of selecting bridge point 504-2 or 504-3. In each example, the selected bridge point 504 is ahead in time of the playback position in source content 302 at the time of the user event.

Template 506 is selected as corresponding to the selected bridge point 504. For example, if bridge point 504-1 is selected, template 506 is a template that is considered close or similar to bridge point 504-1 based on one or more metrics to be described herein in greater detail. In the example, target content 306 is a response to the user's query. Target content 306 includes start 308 (e.g., the first frame of target content 306) and end 310 (e.g., the last frame of target content 306). In one or more embodiments, start 308 and end 310 are neutral frames. For example, in the case where CDN 100 includes a plurality of different target contents 306 (responses), each target content 306 may have the same start 308 and each may have the same end 310. In one or more embodiments, each start 308 is the same as each end 310. That is, in one or more embodiments, each target content 306, which provides different information and includes different content, may start and end with the same frame referred to as the "neutral frame."

In the example of FIG. 5, CDN 100 is capable of dynamically generating a bridge 206 that links the selected bridge point 504-1 in this example with template 506. In one or more embodiments, template 506 is the same frame as start 308 and the same frame as end 310. In that case, CDN 100 may target content 306 following the playback of the dynamically generated bridge 206 and the playback of template 506.

In one or more embodiments, template 506 is not the same frame as start 308 and/or end 310. In that case, if a metric specifying dissimilarity between template 506 and start 308 and/or end 310 does not exceed a dissimilarity threshold, CDN 100 may play the dynamically generated bridge 206, template 506, and target content 306 in that order. In transitioning back to source content 302, CDN 100 may play template 506 following end 310 and play a further dynamically generated bridge 206 that links template 506 with the selected bridge point 506-1 in that order. It should be appreciated that the two bridges played-one transitioning from source content 302 to template 506 and the other transitioning from template 506 to source content 302—serve to transition the content played to the user in opposing directions.

In the case where the dissimilarity between template 506 and start 308 and/or end 310 exceeds the dissimilarity threshold, CDN 100 may select a pre-generated or cached template segment. Each template segment links a particular template with starts and/or ends of target contents. In that case, CDN 100 may play the dynamically generated bridge 206, template 506, the selected template segment that links to start 308, and the target content 306 in that order. In transitioning back to source content 302, following end 310, CDN 100 may play another template segment that links end 310 with template 506, template 506, and a further dynamically generated bridge 206 that links template 506 with the selected bridge point 506-1 in that order.

For purposes of illustration, in the case where CDN 100 is used for audio, source content 302 may be a selected type of background noise. Examples of background noise may include, but are not limited to, engine sounds, fan sounds, or other machine noises/sounds, people chatting in the distance, the sound of water/river, and/or the sound of wind in the trees. In these examples, bridges may be used to transition from a bridge entry point to the template in the audio domain. For example, a direct audio interpolation may be performed. In another example, a fade-out and fade-in effect may be generated as the bridge. In such a use case, any cached content would be audio.

Figure 6:
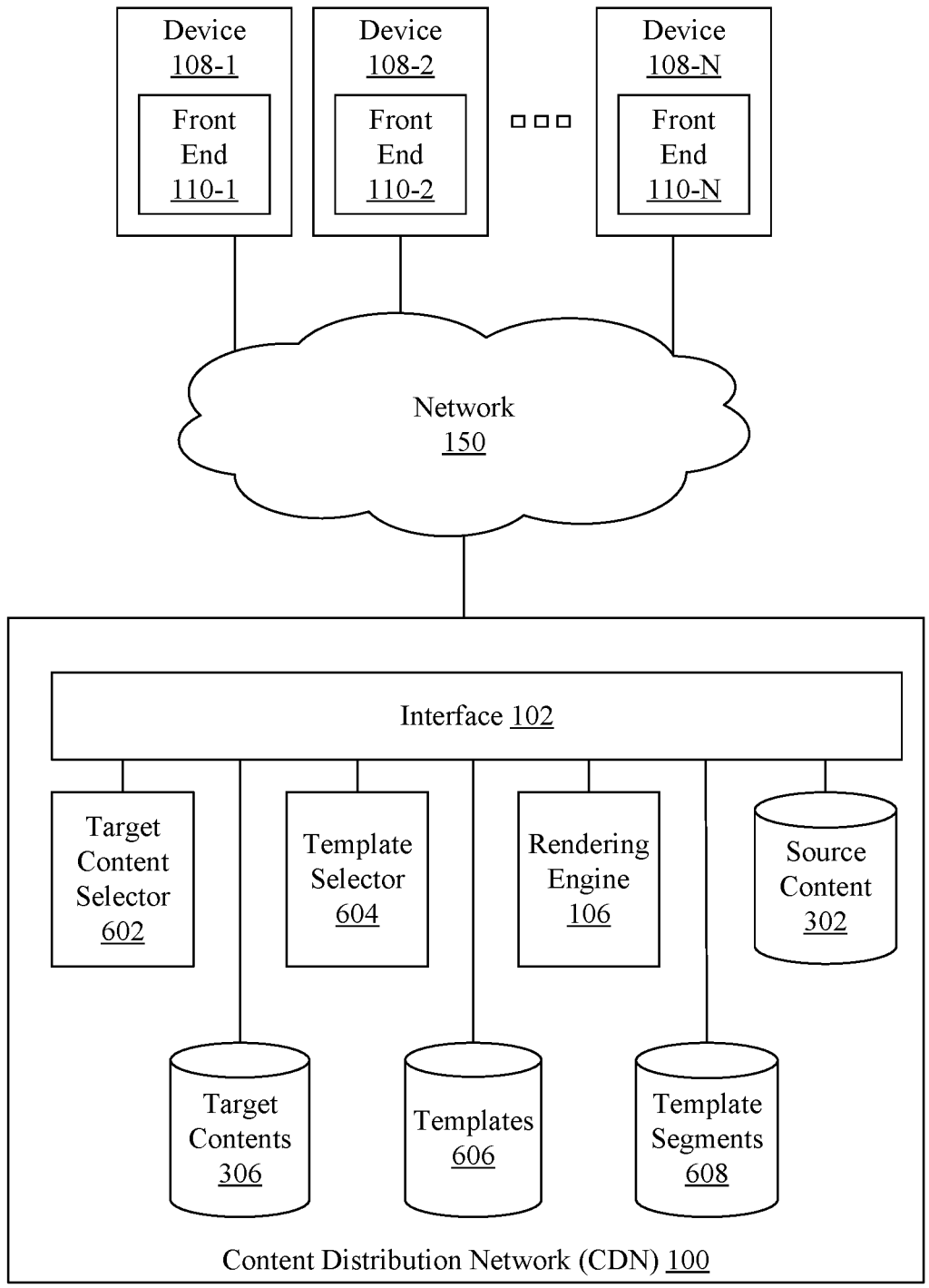
FIG. 6 illustrates another example of a CDN in communication with one or more user devices.

FIG. 6 illustrates another example of a CDN 100 in communication with one or more user devices. The example of FIG. 6 illustrates another executable framework for CDN 100. As shown, CDN 100 may be in communication, e.g., coupled with, a plurality of different devices 108. Each device 108 (e.g., device 108-1, 108-2, . . . , 108-N), as described in the example of FIG. 1, is capable of executing a respective front end 110 (e.g., front end 110-1, 110-2, . . . , 110-N). Devices 108 may number in the thousands or millions. CDN 100 is capable of engaging in an interactive dialog with the user of each of devices 108.

In the example of FIG. 6, CDN 100 includes a target content selector 602, a template selector 604, and rendering engine 106. Source content 302, target contents 306, a plurality of templates 606, and a plurality of template segments 608 are stored in one or more data storage devices included within or accessible by CDN 100. In FIG. 6, each of source content 302, target contents 306, templates 606, and template segments 608 are examples of cached content 104. Interface 102 is configured to coordinate operation of target content selector 602, template selector 604, and rendering engine 106. Further, interface 102 is capable of coordinating the playing or playback of both dynamically generated content and cached content 104 to one or more or all of devices 108.

In operation, a user may access device 108-1 and front end 110-1. For example, device 108-1 may establish a communication session with CDN 100 via network 150. Interface 102 may receive requests, e.g., user events, from device 108-1 executing front end 110-1. In establishing the communication session, interface 102 may be playing source content 302. As noted, interface 102 may play source content 302 in a continuous loop at least until a user event is received from device 108-1. As an illustrative and non-limiting example, source content 302 may be a loop of visual media, sound media, or audiovisual media playing a digital human in listening state 202. As displayed on device 108-1, the digital human appears to be awaiting a user interaction (e.g., a user input).

In response to interface 102 receiving a user event, interface 102 passes the user event to target content selector 602. Target content selector 602 is capable of selecting a particular target content (e.g., response) 306 to be played back to the user via device 108-1. For example, target content selector 602 may be implemented as an interactive system such as a chat bot, interactive voice response system, or the like that is capable of semantically analyzing the received user event and choosing a particular target content 306 from the plurality of available target contents. The target content that is chosen is one that is determined to most likely or best answer the user's query. The user's query may be textual input, whether directly specified by the user as a text input or speech that is recognized and converted to text. Target content selector 602 may indicate the selected target content 306 to interface 102.

Interface 102 receives, as part of the user event, a timestamp. Interface 102 compares the timestamp of the user event with a location within source content 302 that was played by device 108-1 or conveyed to device 108-1 at or about the time of the timestamp. For example, interface 102 is capable of detecting a current playback position within source content 302 that is the same as or matches the timestamp of the user event. In one or more embodiments, the user event may specify a playback location of source content that was playing at the time the user input was received resulting in the user event. In any case, interface 102 is capable of selecting a particular bridge point 504 within source content 302 in response to the user event. In one or more embodiments, interface 102 selects a next bridge point in time within source content 302 from the location of playback in source content 302 that matches the timestamp of the user event. That is, interface 102 selects the next bridge point in time within source content 302 from the playback location within source content 302 at the time of the user event.

Interface 102 is capable of notifying template selector 604 of the selected bridge point 504. Template selector 604 is configured to choose a selected template 506 from the plurality of templates 606 based on a selected bridge point 504 chosen from the plurality of bridge points of source content 302. That is, template selector 604 is configured to select a particular template from templates 606, e.g., template 506, based on the selected bridge point 504. In one aspect, template selector 604 compares the selected bridge point, e.g., 504-1, with each template 606 of the plurality of templates to calculate a metric specifying dissimilarity between the bridge point 504-1 and the respective template. Template selector 604 is capable of selecting the template from templates 606 having the lowest dissimilarity (e.g., the metric with the smallest value). Accordingly, the template may be selected from the plurality of templates (e.g., cached templates) based on metrics indicating dissimilarity between the bridge point 504-1 and each template of the plurality of templates.

In one or more embodiments, the template and the bridge point include image frames. In some examples, each of the template and the bridge point is an image frame. In one or more other embodiments, the template and the bridge point include audio information. In some examples, each of the template and the bridge point is a portion (e.g., a sample) of audio information. In still one or more other embodiments, each of the template and the bridge point includes an image frame and audio information.

Interface 102 is capable of providing rendering engine 106 with the selected template and the selected bridge point. Rendering engine 106 is configured to dynamically generate a bridge 206 linking the selected bridge point 504 of source content 302 with the selected template 506. More particularly, rendering engine 106 is capable of dynamically generating a bridge that links the selected bridge point 504-1 with the selected template 506. Appreciably, in the case where source content 302 and the target contents 306 are visual content (e.g., image frames), rendering engine 106 generates the bridge as visual content. In the case where source content 302 and the target contents 306 are audio content, rendering engine 106 generates the bridge as audio content. In the case where source content 302 and the target contents 306 are audiovisual content, rendering engine 106 generates the bridge as audiovisual content.

In one or more embodiments, template segments 608 are correlated with templates 606. For example, each template 606 may be correlated or associated with at least one particular template segment 608. Each template segment 608 is a portion of content that links a particular template with the start of the selected target content. Appreciably, template segments 608 also link respective target contents with respective templates 606 in the reverse direction. That is, for a given template 606, template segments 608 may store a template segment that is used to transition from the selected template to the start of a selected target content and a template segment that is used to transition from the end of the selected target content to the selected template. As noted, in some embodiments, the start and end of a given target content is the same. In some embodiments, the start and the end of each target content is the same, which reduces the number of template segments that need to be cached. With interface 102 being notified of the selected template, interface 102 is capable of determining the particular template segments associated with, or to be used with, the selected template 506.

Accordingly, in response to the user event, interface 102 is capable of conveying the dynamically generated bridge, the selected template 506, the selected template segment, and the selected target content to device 108-1 for playback. The playback by device 108-1 may be in the order specified, i.e., where following the selected bridge point 504-1 of source content 302, the bridge is played followed by the selected template 506, followed by the template segment linking selected template 506 with the start of the selected target content, followed by the selected target content. The conveyed content may be played by device 108-1 immediately following the playback of the selected bridge point 504-1. Further the content may be played in a seamless manner.

It should be appreciated that the same or similar process may be implemented to transition from the end of the selected content 306 back to the source content 302. In the example, rendering engine 106 also may generate a bridge that links the template back to the selected bridge point 504-1. Further, the selected template also may be associated with a template segment that links the end of the selected content with the selected template 506. Accordingly, interface 102 may convey the template segment linking the end of the selected target content with the selected template 506 and the dynamically generated bridge that links the selected template with the selected bridge point 504-1. Interface 102 optionally resends the selected template 506. Device 108-1 may playback the template segment linking the end of the selected target content with the selected template 506, the selected template 506, and the dynamically generated bridge that links the selected template 506 with the selected bridge point 504-1 in that order. Immediately following, interface 102 may continue to convey source content 302 continuing from the selected bridge point 504-1. Device 108-1 may continue playback of source content 302 from the selected bridge point 504-1.

In one or more embodiments, CDN 100 may use a different bridge point as an entry point in transitioning from the end of the selected target content back to source content 302 than was used as an exit point to transition from source content 302 to the selected target content. In one or more examples, CDN 100 may use multiple templates. The use of multiple templates provides several advantages such as providing CDN 100 with more diversity and variation so as to appear and/or feel less "looped." This may be particularly useful as CDN 100 is scaled to serve a larger number of users. For purposes of illustration, CDN 100 may use a first template, e.g., template X, that is selected as being closer in terms of the distance metric to the bridge point used as an exit point when exiting the source content and a second template, e.g., template Y, when entering or returning to source content from the selected target content. Template Y may be considered closer to the end of the target content that was played than template X. In that case, CDN 100 may play a template segment that links the end of the target content with template Y and generate a further dynamically generated bridge linking template Y with a bridge point selected as an entry point for the source content, where the bridge point selected as an entry point is different from the bridge point selected as the exit point. In some cases, template X and template Y may be the same. In other cases, template X and template Y may be different. In the latter case where template X and template Y are different, a different bridge point may be selected as the entry point than was used as the exit point, where the template segment links template Y with the entry point of the source content.

In one or more other embodiments, a single template may be used to exit the source content and to enter (e.g., re-enter) the source content from the selected target content. In the single template case, CDN 100 still may use a different bridge point as the entry point than is used as the exit point. In this example, the two different bridge points (e.g., one used to exit and the other used to re-enter the source content) may be equally close or within a predetermined threshold or percentage of one another in terms of the distance metric to the template. In this case, the two bridge points are different, but are considered similar or equivalent in terms of the distance metric used so as to add diversity to CDN 100 content playback and/or generation.

In one or more of the examples described herein, in cases where the target contents have same starts and same ends, the target contents may be selected based purely on semantic analysis of the user event and is independent of the selection of a particular bridge point and independent of the selection of a particular template and any associated template segments.

Figure 7:
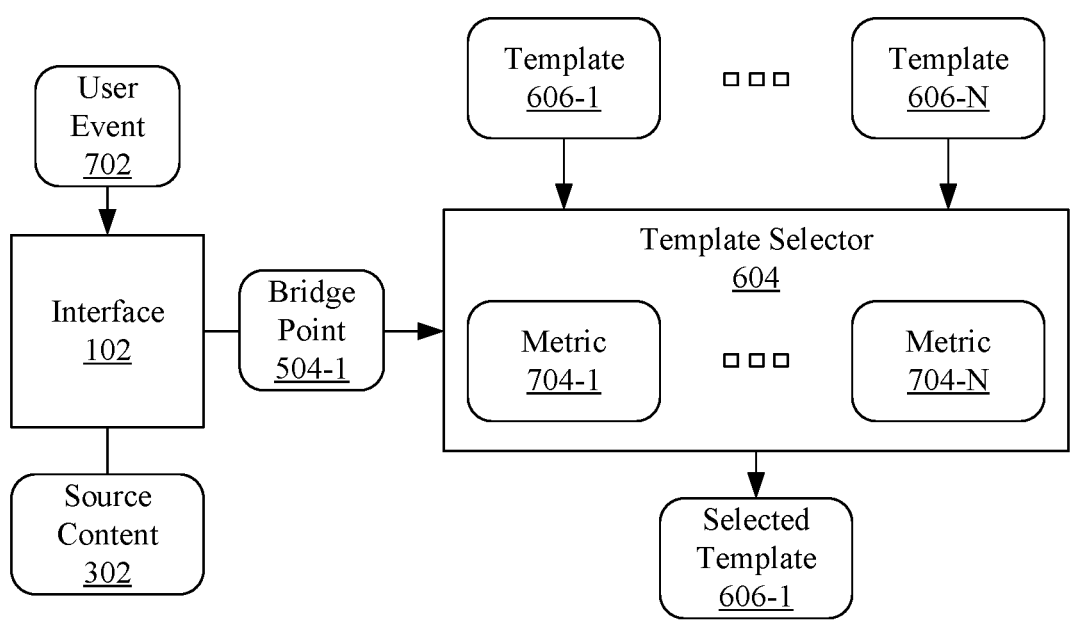
FIG. 7 illustrates template selection as performed by the CDN in accordance with one or more embodiments of the disclosed technology.

FIG. 7 illustrates template selection as performed by CDN 100 in accordance with one or more embodiments of the disclosed technology. In the example, interface 102 receives user event 702, which may include or specify the user's query and the timestamp or other timing information that indicates a playback position or location in source content 302 at the time user event 702 is generated (e.g., the time the user input is received). Interface 102 selects a particular bridge point 504, e.g., bridge point 504-1, from source content 302 based on user event 702, e.g., the timestamp thereof and the current playback position within source content 302. Interface 102 provides bridge point 504-1 to template selector 604. Template selector 604 compares bridge point 504-1 with each of templates 606. For example, template selector 604 generates metrics 704 (e.g., metrics 704-1 through 704-N) that specify a measure of dissimilarity between the selected bridge point 504 and each respective template 606 (e.g., templates 606-1 through 606-N). For example, metric 704-1 specifies the dissimilarity between selected bridge point 504-1 with template 606-1. Metric 704-N specifies the dissimilarity between selected bridge point 504-1 and template 606-N.

In one or more embodiments, template selector 604 selects the particular template 606 that has the lowest dissimilarity, e.g., the lowest metric. In the example of FIG. 7, template selector 604 selects template 606-1 as the selected template as metric 704-1 is the lowest metric and, as such, indicates the lowest amount of dissimilarity. In other words, template 606-1 is more similar to bridge point 504-1 than any other of templates 606.

In one or more embodiments, the metric used to specify dissimilarity may capture the distance between portions of content to be joined by a dynamically generated bridge. In order to meet the latency requirements of CDN 100, the metric is one that may be computed with relative ease and without undue computational resources. Further, the metric reflects changes as perceived by human beings in watching and/or listening to content. For example, in the case of RGB images, the metric returns a higher number for two portions of content (e.g., image frames) that are visually dissimilar and a lower number otherwise. Accordingly, in one or more embodiments, the metric measures the Euclidean distance between two portions of content. The Euclidean distance may be used to measure distance (e.g., dissimilarity) between two image frames, between two audio samples, and/or both. In the case of image frames, for example, the Euclidean distance may be used to track motion of salient objects between the source content and target content. It should be appreciated that the various metrics described herein may be used in any of the various cases and/or examples where a dissimilarity metric may be used. Further, it should be appreciated that a measure of dissimilarity also conveys the degree of similarity between two elements.

Depending on the particular domain in which CDN 100 is used, e.g., the particular type of content that is being delivered, the metric may be applied to different types of content. As noted, the metric may be applied to audio. In the case of visual material, the metric may be applied to RGB image frames. In other examples for visual material, the metric may be applied to image frames that include (e.g., only include) contours and keypoints, to 2D projections of keypoints from a 3D space, and/or to RGB renderings of image frames containing contours and/or keypoints.

In one or more embodiments, the length of the bridge is determined based on the dissimilarity between two frames to be joined by the bridge. The maximum distance and, as such, bridge length, may be established for CDN 100 through pre-generation of the templates given that the bridge points also are known.

In one or more other embodiments, the metric indicating dissimilarity may be calculated using sparse optical flow. For example, in cases where the content includes motion or significant motion, sparse optical flow may be calculated to determine similarity or dissimilarity as the case may be. For purposes of illustration, consider an example in which the source content is cars moving on a highway (e.g., at high speeds). The source content is a very dynamic scene. In that case, considering the translation of the cars when computing the source-target similarity is an important consideration. In that case, the similarity metric may be based on the sparse optical flow of salient points between the source content and targets being compared. In such cases, metrics based on RGB pixel similarity may not be suitable.

Figure 8:
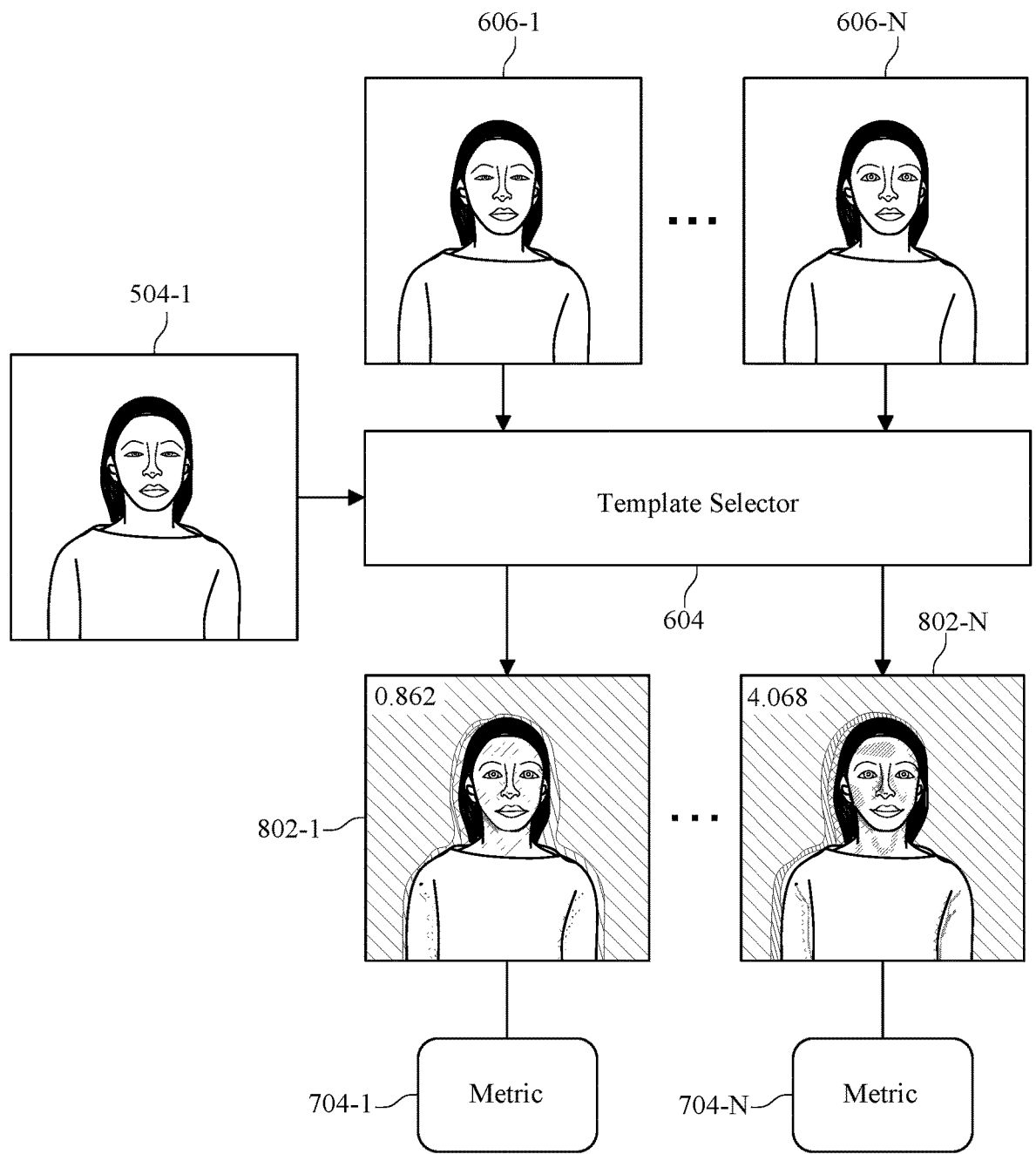
FIG. 8 illustrates another example of template selection as performed by the CDN in accordance with one or more embodiments of the disclosed technology.

FIG. 8 illustrates another example of template selection as performed by CDN 100 in accordance with one or more embodiments of the disclosed technology. In the example of FIG. 8, the type of content played is that of a digital human (e.g., a sequence of a plurality of image frames). Bridge point 504-1 is illustrated from source content 302. Template selector 604 selects a template from the plurality of templates 606 based on the distance metrics 704 as calculated. In the example of FIG. 8, comparisons 802 are illustrated between the selected bridge point 504 and each respective template 606. That is, comparisons 802 visually illustrate Euclidean distance for the respective templates compared with bridge point 504-1. As illustrated, the shading in comparisons 802 illustrates that comparison 802-N is more dissimilar from selected bridge point 504-1 than comparison 802-1. In the example, the distance metric for template 606-1 corresponding to comparison 802-1 is 0.862. The distance metric for template 606-N corresponding to comparison 802-N is 4.068. In this example, template selector 604 selects template 606-1 as the template with the lowest metric indicating the lowest dissimilarity.

Figure 9:
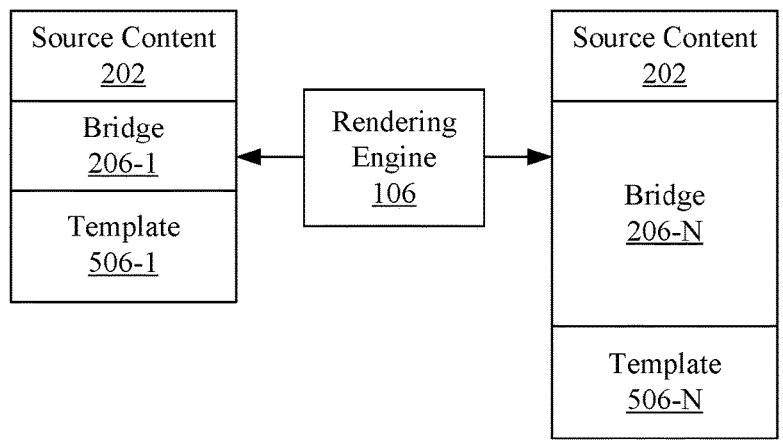
FIG. 9 illustrates influence of the selected template on the dynamically generated bridge in accordance with one or more embodiments of the disclosed technology.

FIG. 9 illustrates the influence of the selected template on the dynamically generated bridge in accordance with one or more embodiments of the disclosed technology. In the example of FIG. 9, metric 704-1 has a lowest value indicating that template 606-1 had the lowest dissimilarity compared to the selected bridge point 504-1. For purposes of illustration, template 606-N was the most dissimilar template of all of the cached templates as indicated by metric 704-N. FIG. 9 illustrates that the length of bridge 206-1, which is dynamically generated by rendering engine 106 to link the selected bridge point 504-1 of source content 302 with template 606-1 is shorter than bridge 206-N, which is the bridge that would need to be generated by rendering engine 106 to link the selected bridge point 504-1 of source content 302 with template 606-N. FIG. 9 illustrates that the workload placed on CDN 100 by selecting the template that is most similar with the selected bridge point is reduced in that the amount of dynamically generated material that needs to be generated is reduced.

Figure 10:
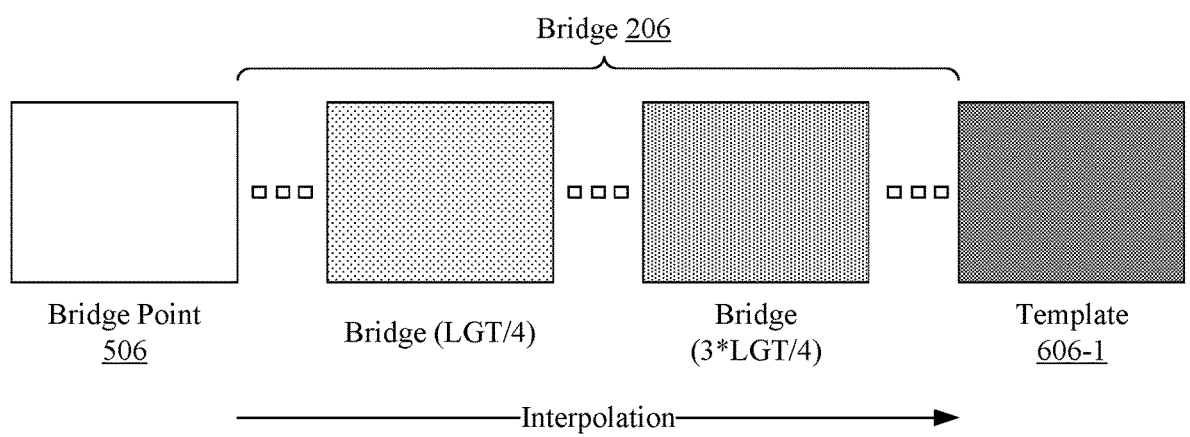
FIG. 10 illustrates an example of the dynamic generation of a bridge as performed by a rendering engine of the CDN.

FIG. 10 illustrates an example of the dynamic generation of a bridge as performed by rendering engine 106 of CDN 100. In the example, rendering engine 106 is capable of generating bridge 206 using interpolation. The example of FIG. 10 illustrates the frames generated that link the selected bridge point 504-1 with the selected template 606-1. Referring to FIGS. 7, 8, and 9 collectively, it may be seen that if the amount of variation between consecutively generated frames of bridge 206 is kept to a predetermined amount that provides a smooth transition (e.g., smooth movement, glitch free movement, artifact free audio, etc.) as perceived by a user, then the interpolation technique will modify each frame to arrive at the next frame of the bridge 206 by no more than a predetermined amount. This illustrates how the length of bridge 206 is based on, or dictated by, the dissimilarity between the selected bridge point 504-1 and the selected template 606-1. Lower dissimilarities result in shorter bridges.

As discussed, the type of bridge that is generated will vary based on the domain in which CDN 100 is used. The bridge may be generated as audio, as a synthetic rendering of the audio signal in the RGB space, as frames of keypoints where RGB image frames may be generated from the frames of keypoints generated by rendering engine 106, or using the pixels in RGB image frames corresponding to the source content and the template. In some embodiments, linear interpolation techniques may be used. In other embodiments, non-linear interpolation techniques may be used. In still other embodiments, both linear and non-linear interpolation techniques may be used. For example, the type of interpolation technique (e.g., function) that is used may be dependent on the initial input representation provided to the various generative networks used to generate content that may be cached or generated dynamically. In the cases where the input representation is considered sparse (e.g., sparse body such as one or more contours and/or facial landmarks such as keypoints), linear interpolation may be used. In cases where the input representation is of greater density (e.g., 2D coordinates, pixels, or audio data), non-linear interpolation and spline fitting may be used. Those skilled in the art will recognize that any of a variety of known interpolation techniques may be used and the inventive arrangements are not intended to be limited to the particular interpolation technique(s) applied. In one or more embodiments, rendering engine 106 may include a dedicated model that is trained to perform interpolation directly in the RGB space, e.g., directly on RGB image frames.

Depending on how far apart the template and bridge point are in the relevant domain space (e.g., audio/keypoints/RGB), e.g., the magnitude of the dissimilarity, rendering engine 106 is capable of regressing to an optimal length of the bridge to be generated. This process of transitioning from the source content to the target content, as described herein using the metrics and templates, improves realism of the transitions, reduces the computational burden placed on a generative CDS, and reduces system latency (e.g., saves time).

With the bridge point and the template having been selected or estimated, template selector 604 estimates the optimal bridge length for the pair. The optimal bridge length may be calculated based on the number of frames needed to transition between the bridge point and the template without any two consecutive frames of the bridge having a metric indicating a dissimilarity that exceeds a predetermined threshold of dissimilarity.

Figure 11:
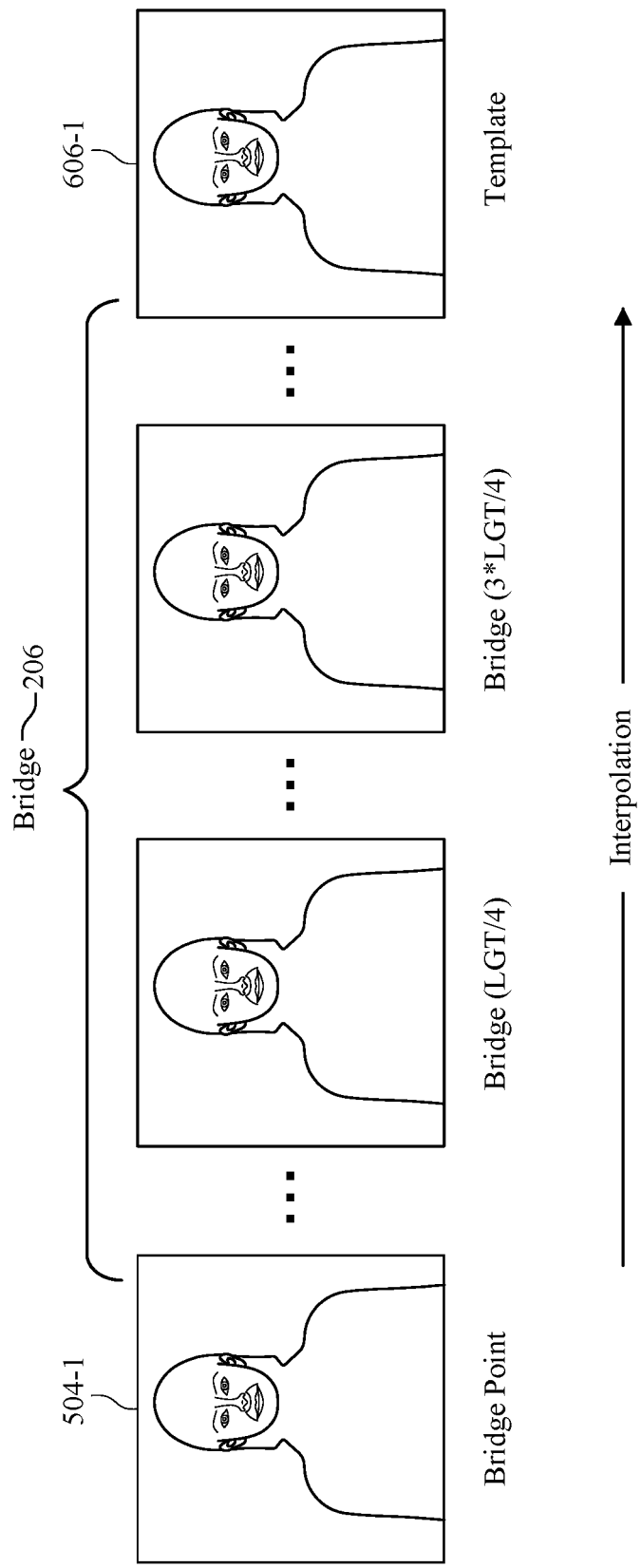
FIG. 11 illustrates another example of the dynamic generation of a bridge as performed by the rendering engine of the CDN.

FIG. 11 illustrates another example of the dynamic generation of a bridge as performed by rendering engine 106 of CDN 100. The example of FIG. 11 illustrates an example in which the rendering engine 106 generates the bridge as frames including countour(s) and keypoint(s) (e.g., only contour(s) and keypoint(s)) from which RGB images may be rendered. The interpolation performed by rendering engine 106 is performed in the contour-keypoint domain.

Figure 12:
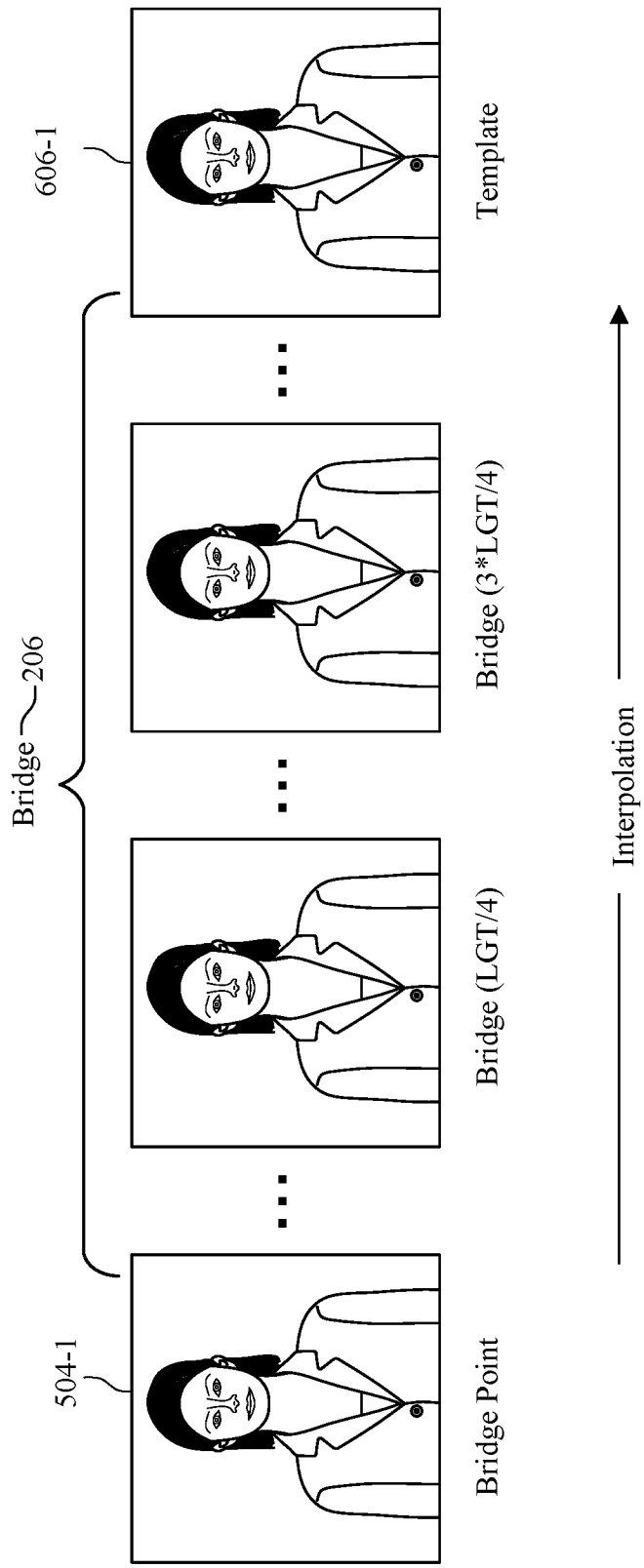
FIG. 12 illustrates another example of the dynamic generation of a bridge as performed by the rendering engine of the CDN.

FIG. 12 illustrates another example of the dynamic generation of a bridge as performed by rendering engine 106 of CDN 100. The example of FIG. 12 illustrates an example in which the rendering engine 106 generates the bridge as RGB frames. In the example of FIG. 12, the interpolation performed by rendering engine 106 is directly in the RGB domain.

In FIGS. 10, 11, and 12, the frames of the bridge as generated look more like the source at the left side (e.g., bridge LGT/4 where LGT stands for the length of the bridge as calculated by the rendering engine 106) and look more like the target near the right side (e.g., bridge 3*LGT/4). In this example, the source is bridge point 504-1 and the target is the template 606-1. Rendering engine 106 is capable of connecting or stitching together the illustrated frames to generate a final media (e.g., video in this case) sequence that may be played or otherwise conveyed to the user's device 108.

The inventive arrangements described herein may be used to generate digital humans within virtual computing environments, e.g., metaverse worlds. The digital humans may be generated in high resolution for use as avatars, for example. The high-quality and high resolution achieved is suitable for such environments where close-up interaction with the digital human is likely. Different example contexts and/or use cases in which the CDN 100 may be used, particularly in the case where digital humans are conveyed as the content are discussed below.

In one or more embodiments, CDN 100 may be used to generate or provide a virtual assistant. The virtual assistant may be presented on device 108 within a business or other entity such as a restaurant. Device 108 may present the virtual assistant embodied as a digital human driven by CDN 100 in lieu of other conventional kiosks found in restaurants and, in particular, fast-food establishments. The CDN 100 may present a digital human configured to operate as a virtual assistant that is pre-programmed to help with food ordering. The virtual assistant can be configured to answer questions regarding, for example, ingredients, allergy concerns, or other concerns as to the menu offered by the restaurant.

The inventive arrangements described herein also may be used to generate digital humans that may be used as, or function as, virtual news anchors, presenters, greeters, receptionists, coaches, and/or influencers. Example use cases may include, but are not limited to, a digital human performing a daily news-reading, a digital human functioning as a presenter in a promotional or announcement video, a digital human presented in a store or other place of business to interact with users to answer basic questions, a digital human operating as a receptionist in a place of business such as a hotel room, vacation rental, or other attraction/venue. Use cases include those in which accurate mouths and/or lip motion for enhanced realism is preferred, needed, or required. Coaches and influencers would be able to create virtual digital humans of themselves which will help them to scale and still deliver personalized experiences to end users.

In one or more other examples, digital humans generated in accordance with the inventive arrangements described herein may be included in artificial intelligence chat bot and/or virtual assistant applications as a visual supplement. Adding a visual component in the form of a digital human to an automated or AI enabled chat bot may provide a degree of humanity to user-computer interactions. The disclosed technology can be used as a visual component and displayed in a display device as may be paired or used with a smart-speaker virtual assistant to make interactions more human-like. The cache-based system described herein maintains the illusion of realism.

In one or more examples the virtual chat assistant may not only message (e.g., send text messages) into a chat with a user, but also have a visual human-like form that reads the answer. Based on the disclosed technology, the virtual assistant can be conditioned on both the audio and head position while keeping high quality rendering of the mouth.

In one or more other examples, CDN 100 may be used in the context of content creation. For example, an online video streamer or other content creator (including, but not limited to, short-form video, ephemeral media, and/or other social media) can use CDN 100 to automatically create videos instead of recording themselves. The content creator may make various video tutorials, reviews, reports, etc. using digital humans thereby allowing the content creator to create content more efficiently and scale up faster.

The inventive arrangements may be used to provide artificial/digital/virtual humans present across many vertical industries including, but not limited to, hospitality and service industries (e.g., hotel concierge, bank teller), retail industries (e.g., informational agents at physical stores or virtual stores), healthcare industries (e.g., in office or virtual informational assistants), home (e.g., virtual assistants, or implemented into other smart appliances, refrigerators, washers, dryers, and devices), and more. When powered by business intelligence or trained for content specific conversations, artificial/digital/virtual humans become a versatile front-facing solution to improve user experiences.

The inventive arrangements are capable of communicating naturally, responding in contextualized exchanges, and interacting with real humans in an efficient manner with reduced latency and reduced computational overhead.

In one or more embodiments, CDN 100 supports changing different components in a plug-and-play fashion based on the particular domain in which the system is used. For example, if CDN 100 is to be used with video streams of cars on a highway, the CDN 100 may generate and/or play an infinitely long video stream (e.g., source content) of highway traffic using a finite amount or number of cached video segments of cars. In that case, the similarity metric may be changed as previously discussed (e.g., to use sparse optical flow) by swapping the template selector and/or interpolation technique used by the rendering engine.

For example, the interpolation technique may be changed to one that preserves the perspective camera changes at a suitable and predetermined level and is configured to handle large scale changes in the bridge. The interpolation technique would be able to render frames of a car approaching a camera where the car appears larger when closer to the camera.

In one or more other embodiments, CDN 100 may be used with or as part of an online video gaming system or network.

Figure 13:
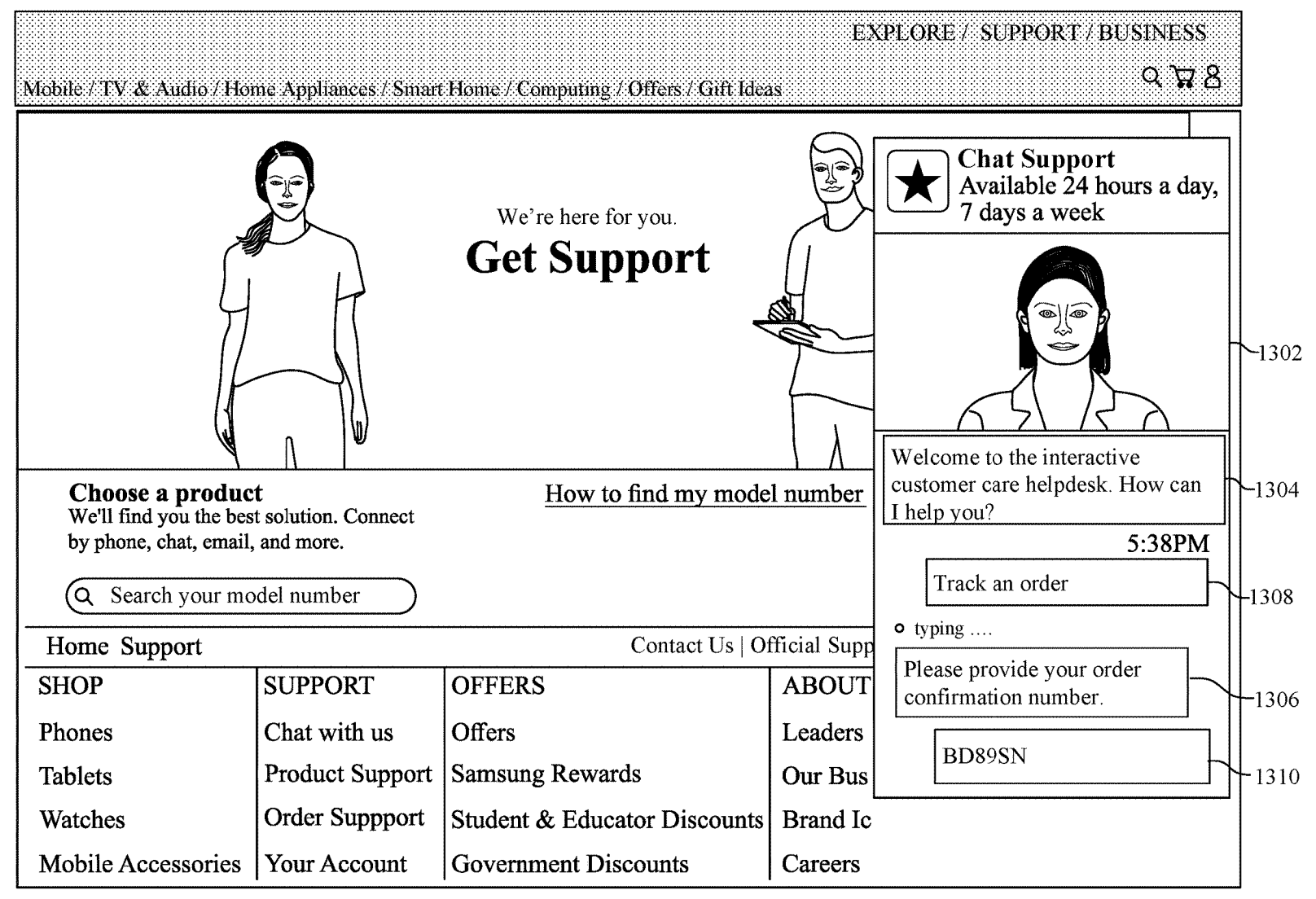

FIG. 13 illustrates an example implementation in which CDN 100 is used in the context of chat support. In the example, a view generated by front end 110 as may be displayed on a display of device 108 is shown. In the example, region 1302 displays content delivered or played by CDN 100. In the example, the digital human shown speaks the target responses that are also conveyed as text messages 1304, 1306. The user response is shown as text message 1308. Further, the user is able to interact with the digital human and CDN 100 by way of the field 1310 whether by voice or typing.

Figure 14:
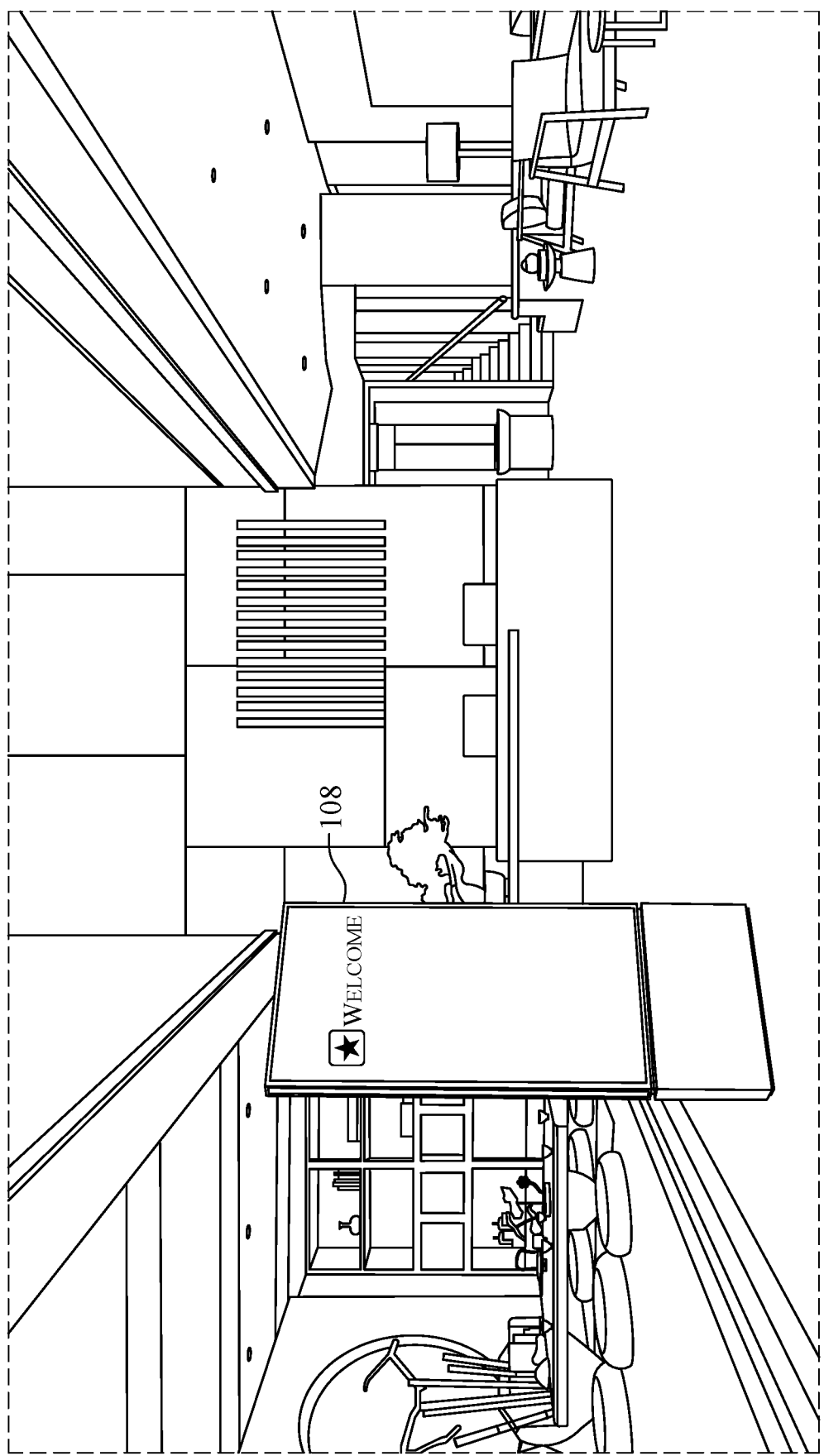
FIG. 14 illustrates an example in which a device through which a user interacts with the CDN is implemented as a kiosk.

FIG. 14 illustrates an example in which device 108 is implemented as a kiosk having a screen, microphone, optionally a camera or other presence sending device, and display to play content to a user and receive input from the user.

Figure 15:
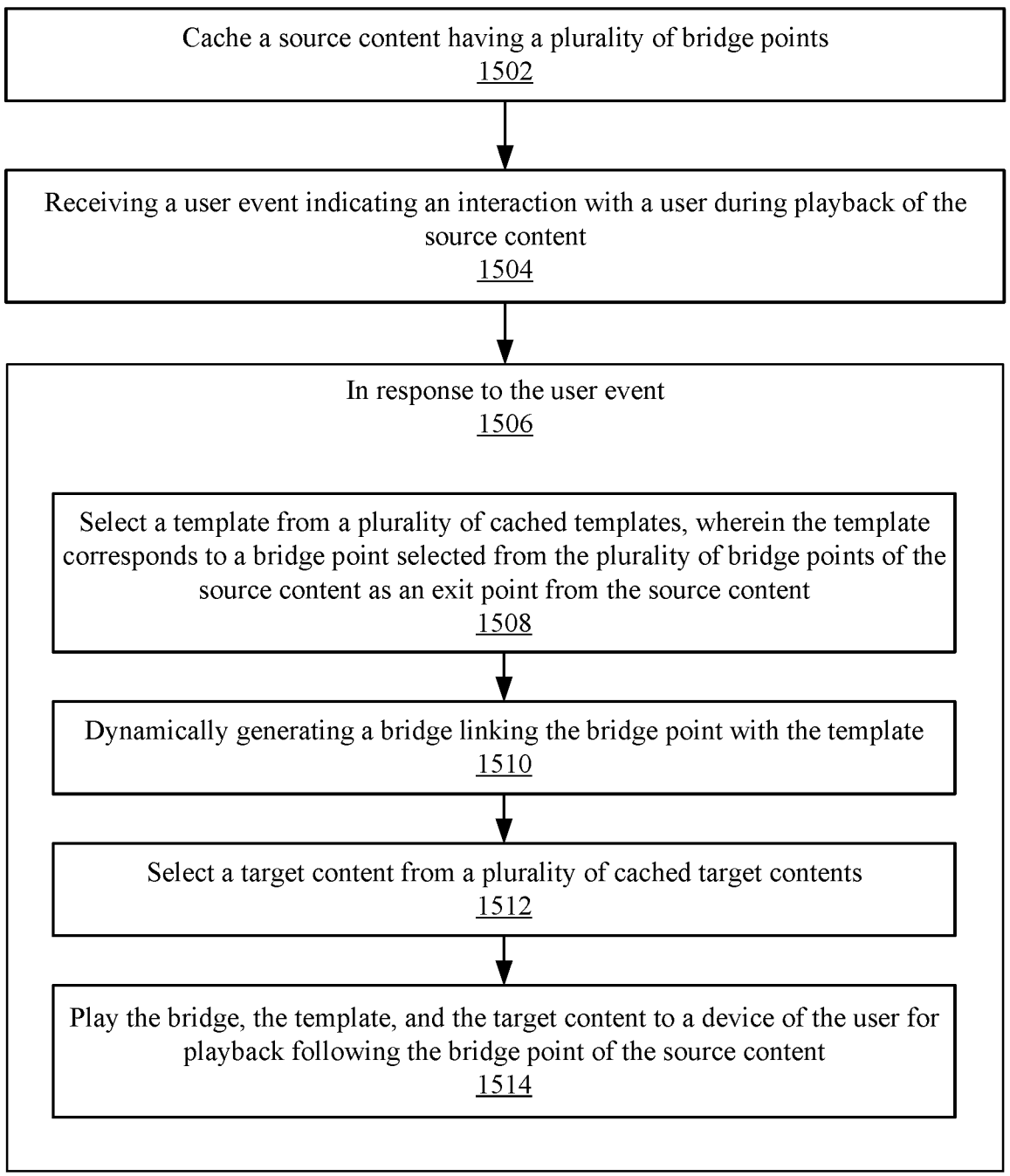
FIG. 15 is an example method illustrating certain operative features of the CDN in accordance with one or more embodiments of the disclosed technology.

FIG. 15 is an example method 1500 illustrating certain operative features of CDN 100 in accordance with the inventive arrangements disclosed herein. In block 1502, source content 302 is cached within CDN 100. As noted, source content 302 includes a plurality of bridge points 504. In block 1504, interface 102 receives a user event 702 indicating an interaction with a user. The user event may be received during playback of source content 302. In block 1506, in response to the user event, CDN 100 performs a plurality of operations. In block 1508, template selector 604 selects a template from a plurality of cached templates. The template that is selected corresponds to a bridge point selected from the plurality of bridge points of source content 302 as an exit point from source content. In block 1510, rendering engine 106 dynamically generates a bridge linking the bridge point with the template. In block 1512, target content selector 602 selects a target content from a plurality of cached target contents. In block 1514, interface 102 plays the bridge, the template, and the target content to a device of the user for playback following the bridge point of the source content.

In another aspect, template selector 604 selects a template segment associated with the template from a plurality of cached template segments. The template segment associated with the template links the template with a start of the target content. The template segment is played to the device for playback following the template and before the target content.

In another aspect, rendering engine 106 dynamically generates a further bridge linking the template with a start of the template segment based on a metric indicating an amount of dissimilarity between the template and the start of the template segment exceeding a threshold amount of dissimilarity.

In another aspect, the template is selected from the plurality of cached templates based on metrics indicating dissimilarity between the bridge point and each template of the plurality of cached templates.

In another aspect, the template and the bridge point include image frames.

In another aspect, the template and the bridge point include audio information.

In another aspect, the template selected from the plurality of cached templates has a metric indicating a lowest dissimilarity.

In another aspect, a length of the bridge depends on a degree of the dissimilarity between the bridge point and the template.

In another aspect, the bridge point is a next bridge point in time within the source content from a playback position in the source content at a time of the user event.

Figure 16:
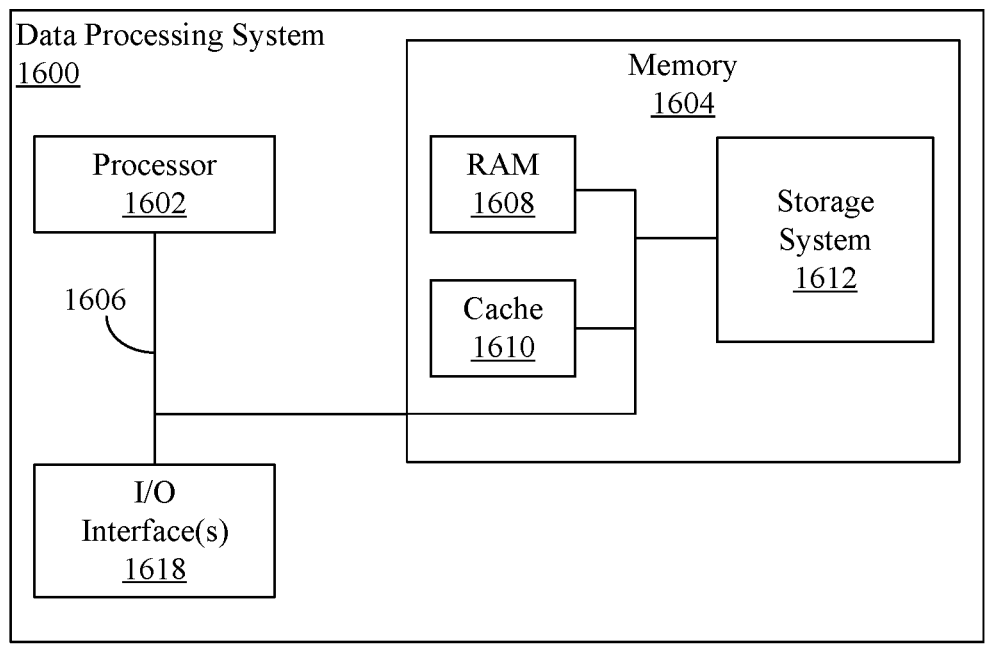
FIG. 16 illustrates an example implementation of a data processing system for use with the CDN described within this disclosure.

FIG. 16 illustrates an example implementation of a data processing system 1600. As defined herein, the term "data processing system" means one or more hardware systems configured to process data, each hardware system including at least one processor and memory, wherein the processor is programmed with computer-readable instructions that, upon execution, initiate operations. Data processing system 1600 can include a processor 1602, a memory 1604, and a bus 1606 that couples various system components including memory 1604 to processor 1602.

Processor 1602 may be implemented as one or more processors. In an example, processor 1602 is implemented as a central processing unit (CPU). Processor 1602 may be implemented as one or more circuits, e.g., hardware, capable of carrying out instructions contained in program code. The circuit may be an integrated circuit or embedded in an integrated circuit. Processor 1602 may be implemented using a complex instruction set computer architecture (CISC), a reduced instruction set computer architecture (RISC), a vector processing architecture, or other known architectures. Example processors include, but are not limited to, processors having an x86 type of architecture (IA-32, IA-64, etc.), Power Architecture, ARM processors, Graphics Processing Units (GPUs), Digital Signal Processors (DSPs), and the like.

Bus 1606 represents one or more of any of a variety of communication bus structures. By way of example, and not limitation, bus 1606 may be implemented as a Peripheral Component Interconnect Express (PCIe) bus. Data processing system 1600 typically includes a variety of computer system readable media. Such media may include computer-readable volatile and non-volatile media and computer-readable removable and non-removable media.

Memory 1604 can include computer-readable media in the form of volatile memory, such as random-access memory (RAM) 1608 and/or cache memory 1610. Data processing system 1600 also can include other removable/non-removable, volatile/non-volatile computer storage media. By way of example, storage system 1612 can be provided for reading from and writing to a non-removable, non-volatile magnetic and/or solid-state media (not shown and typically called a "hard drive"), which may be included in storage system 1612. Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 1606 by one or more data media interfaces. Memory 1604 is an example of at least one computer program product.

Memory 1604 is capable of storing computer-readable program instructions that are executable by processor 1602. For example, the computer-readable program instructions can include an operating system, one or more application programs, other program code, and program data. In one or more embodiments, memory 1604 may store the executable framework implementing CDN 100 as described herein. For example, memory 1604 may store the executable framework of CDN 100 illustrated in FIG. 1 and/or FIG. 6 such that processor 1602 may execute such frameworks.

Processor 1602, in executing the computer-readable program instructions, is capable of performing the various operations described herein that are attributable to a computer. It should be appreciated that data items used, generated, and/or operated upon by data processing system 1600 are functional data structures that impart functionality when employed by data processing system 1600. As defined within this disclosure, the term "data structure" means a physical implementation of a data model's organization of data within a physical memory. As such, a data structure is formed of specific electrical or magnetic structural elements in a memory. A data structure imposes physical organization on the data stored in the memory as used by an application program executed using a processor.

Data processing system 1600 may include one or more Input/Output (I/O) interfaces 1618 communicatively linked to bus 1606. I/O interface(s) 1618 allow data processing system 1600 to communicate with one or more external devices and/or communicate over one or more networks such as a local area network (LAN), a wide area network (WAN), and/or a public network (e.g., the Internet). Examples of I/O interfaces 1618 may include, but are not limited to, network cards, modems, network adapters, hardware controllers, etc. Examples of external devices also may include devices that allow a user to interact with data processing system 1600 (e.g., a display, a keyboard, and/or a pointing device) and/or other devices. Data processing system 1600 may include such additional devices, e.g., a display, upon which images and/or video using such images generated as described herein may be displayed.

Data processing system 1600 is only one example implementation. Data processing system 1600 can be practiced as a standalone device (e.g., as a user computing device or a server, as a bare metal server), in a cluster (e.g., two or more interconnected computers), or in a distributed cloud computing environment (e.g., as a cloud computing node) where tasks are performed by remote processing devices that are linked through a communications network. In a distributed cloud computing environment, program modules may be located in both local and remote computer system storage media including memory storage devices.

As used herein, the term "cloud computing" refers to a computing model that facilitates convenient, on-demand network access to a shared pool of configurable computing resources such as networks, servers, storage, applications, ICs (e.g., programmable ICs) and/or services. These computing resources may be rapidly provisioned and released with minimal management effort or service provider interaction. Cloud computing promotes availability and may be characterized by on-demand self-service, broad network access, resource pooling, rapid elasticity, and measured service.

The example of FIG. 16 is not intended to suggest any limitation as to the scope of use or functionality of example implementations described herein. Data processing system 1600 is an example of computer hardware that is capable of performing the various operations described within this disclosure. In this regard, data processing system 1600 may include fewer components than shown or additional components not illustrated in FIG. 16 depending upon the particular type of device and/or system that is implemented. The particular operating system and/or application(s) included may vary according to device and/or system type as may the types of I/O devices included. Further, one or more of the illustrative components may be incorporated into, or otherwise form a portion of, another component. For example, a processor may include at least some memory.

In one or more other embodiments, data processing system 1600 or another one similar thereto may be used to implement any one or more of devices 108. In using data processing system 1600 as one or more of devices 108, data processing system 1600 may include additional components, devices, and/or systems such as one or more wireless radios and/or transceivers (not shown), an audio system including transducers such as a microphone and speaker, a camera, and/or other available peripheral devices.

Figure 17:
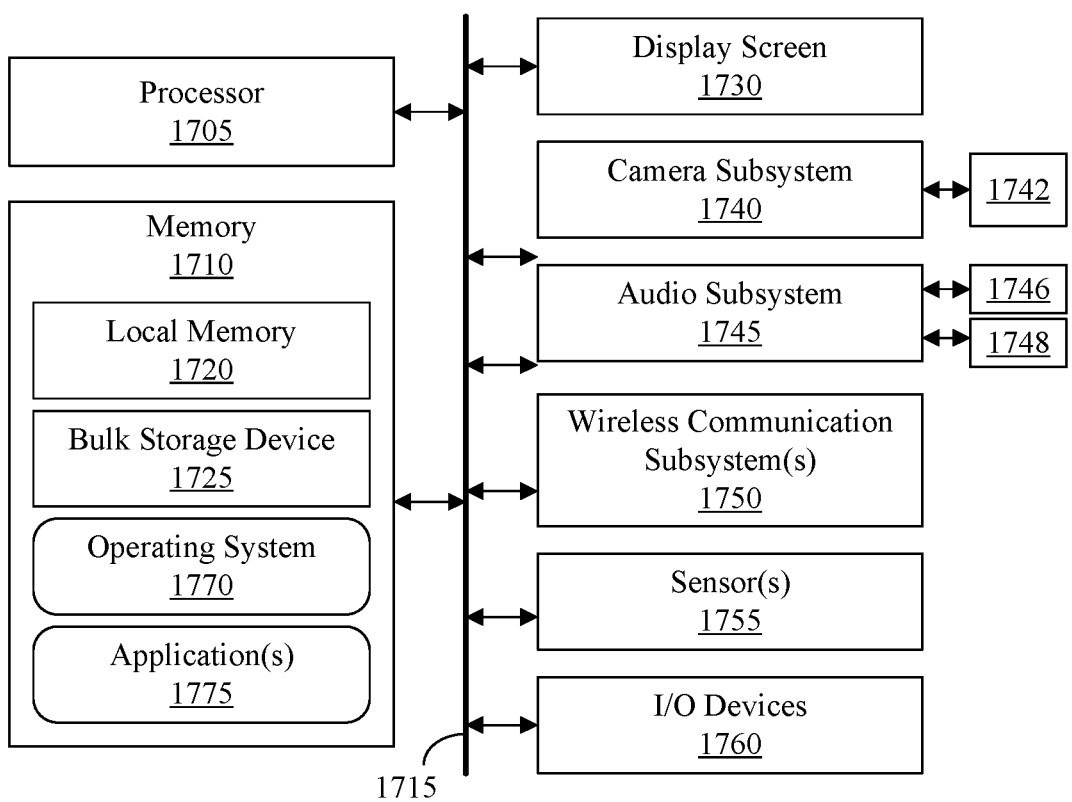
FIG. 17 illustrates an example of a device for use with the CDN in accordance with one or more embodiments of the disclosed technology.

FIG. 17 illustrates an example implementation of device 108 for use with CDN 100 in accordance with one or more embodiments of the disclosed technology. Device 108 includes at least one processor 1705. Processor 1705 is coupled to memory 1710 through interface circuitry 1715. Device 108 stores computer readable instructions (also referred to as "program code") within memory 1710. Memory 1710 is an example of computer readable storage media. Processor 1705 executes the program code accessed from memory 1710 via interface circuitry 1715.

Memory 1710 includes one or more physical memory devices such as, for example, a local memory 1720 and a bulk storage device 1725. Local memory 1720 is implemented as non-persistent memory device(s) generally used during actual execution of the program code. Examples of local memory 1720 include random access memory (RAM) and/or any of the various types of RAM that are suitable for use by a processor during execution of program code. Bulk storage device 1725 is implemented as a persistent data storage device. Examples of bulk storage device 1725 include a hard disk drive (HDD), a solid-state drive (SSD), flash memory, a read-only memory (ROM), an erasable programmable read-only memory (EPROM), electrically erasable programmable read-only memory (EEPROM), or other suitable memory. Device 108 may also include one or more cache memories (not shown) that provide temporary storage of at least some program code in order to reduce the number of times program code must be retrieved from a bulk storage device during execution.

Examples of interface circuitry 1715 include, but are not limited to, an input/output (I/O) subsystem, an I/O interface, a bus system, and a memory interface. For example, interface circuitry 1715 may be implemented as any of a variety of bus structures and/or combinations of bus structures including a memory bus or memory controller, a peripheral bus, an accelerated graphics port, and a processor or local bus.

In one or more embodiments, processor 1705, memory 1710, and/or interface circuitry 1715 are implemented as separate components. In one or more embodiments, processor 1705, memory 1710, and/or interface circuitry 1715 are integrated in one or more integrated circuits. The various components in device 108, for example, can be coupled by one or more communication buses or signal lines (e.g., interconnects and/or wires). In particular embodiments, memory 1710 is coupled to interface circuitry 1715 via a memory interface, e.g., a memory controller (not shown).

Device 108 may include one or more display screens 1730. In particular embodiments, display screen 1730 is implemented as touch-sensitive or touchscreen display capable of receiving touch input from a user. A touch sensitive display and/or a touch-sensitive pad is capable of detecting contact, movement, gestures, and breaks in contact using any of a variety of available touch sensitivity technologies. Example touch sensitive technologies include, but are not limited to, capacitive, resistive, infrared, and surface acoustic wave technologies, and other proximity sensor arrays or other elements for determining one or more points of contact with a touch sensitive display and/or device.

Device 108 may include a camera subsystem 1740. Camera subsystem 1740 can be coupled to interface circuitry 1715 directly or through a suitable input/output (I/O) controller. Camera subsystem 1740 can be coupled to an optical sensor 1742. Optical sensor 1742 may be implemented using any of a variety of technologies. Examples of optical sensor 1742 can include, but are not limited to, a charged coupled device (CCD) or a complementary metal-oxide semiconductor (CMOS) optical sensor. Camera subsystem 1740 and optical sensor 1742 are capable of performing camera functions such as recording images and/or recording video.

Device 108 may include an audio subsystem 1745. Audio subsystem 1745 can be coupled to interface circuitry 1715 directly or through a suitable input/output (I/O) controller. Audio subsystem 1745 can be coupled to a speaker 1746 and a microphone 1748 to facilitate voice-enabled functions, such as voice recognition, voice replication, digital recording, and telephony functions.

Device 108 may include one or more wireless communication subsystems 1750. Each of wireless communication subsystem(s) 1750 can be coupled to interface circuitry 1715 directly or through a suitable I/O controller (not shown). Each of wireless communication subsystem(s) 1750 is capable of facilitating communication functions. Examples of wireless communication subsystems 1750 can include, but are not limited to, radio frequency receivers and transmitters, and optical (e.g., infrared) receivers and transmitters. The specific design and implementation of wireless communication subsystem 1750 can depend on the particular type of device 108 implemented and/or the communication network(s) over which device 108 is intended to operate.

As an illustrative and non-limiting example, wireless communication subsystem(s) 1750 may be designed to operate over one or more mobile networks (e.g., GSM, GPRS, EDGE), a WiFi network which may include a WiMax network, a short-range wireless network (e.g., a Bluetooth network), and/or any combination of the foregoing. Wireless communication subsystem(s) 1750 can implement hosting protocols such that device 108 can be configured as a base station for other wireless devices.

Device 108 may include one or more sensors 1755. Each of sensors 1755 can be coupled to interface circuitry 1715 directly or through a suitable I/O controller (not shown). Examples of sensors 1755 that can be included in device 108 include, but are not limited to, a motion sensor, a light sensor, and a proximity sensor to facilitate orientation, lighting, and proximity functions, respectively, of device 108. Other examples of sensors 1755 can include, but are not limited to, a location sensor (e.g., a GPS receiver and/or processor) capable of providing geo-positioning sensor data, an electronic magnetometer (e.g., an integrated circuit chip) capable of providing sensor data that can be used to determine the direction of magnetic North for purposes of directional navigation, an accelerometer capable of providing data indicating change of speed and direction of movement of device 108 in 3-dimensions, and an altimeter (e.g., an integrated circuit) capable of providing data indicating altitude.

Device 108 further may include one or more input/output (I/O) devices 1760 coupled to interface circuitry 1715. I/O devices 1760 may be coupled to device 108, e.g., interface circuitry 1715, either directly or through intervening I/O controllers (not shown). Examples of I/O devices 1760 include, but are not limited to, a track pad, a keyboard, a display device, a pointing device, one or more communication ports (e.g., Universal Serial Bus (USB) ports), a network adapter, and buttons or other physical controls. A network adapter refers to circuitry that enables device 108 to become coupled to other systems, computer systems, remote printers, and/or remote storage devices through intervening private or public networks. Modems, cable modems, Ethernet interfaces, and wireless transceivers not part of wireless communication subsystem(s) 1750 are examples of different types of network adapters that may be used with device 108. One or more of I/O devices 1760 may be adapted to control functions of one or more or all of sensors 1755 and/or one or more of wireless communication subsystem(s) 1750.

Memory 1710 stores program code. Examples of program code include, but are not limited to, routines, programs, objects, components, logic, and other data structures. For purposes of illustration, memory 1710 stores an operating system 1770 and application(s) 1775. Applications 1775 may include front end 110. Operating system 1770 and/or applications 1775, when executed, are capable of causing device 108 and/or other devices that may be communicatively linked with device 108 to perform the various operations described herein or at least those attributable to device 108. Memory 1710 is also capable of storing data, whether data utilized by operating system 1770, data utilized by application(s) 1775, data received from user inputs, data generated by one or more or all of sensor(s) 1755, data received and/or generated by camera subsystem 1740, data received and/or generated by audio subsystem 1745, and/or data received by I/O devices 1760.

In an aspect, operating system 1770 and application(s) 1775, being implemented in the form of executable program code, are executed by device 108 and, more particularly, by processor 1705, to perform the operations described within this disclosure or at least those attributable to device 108. As such, operating system 1770 and application(s) 1775 may be considered an integrated part of device 108. Further, it should be appreciated that any data and/or program code used, generated, and/or operated upon by device 108 (e.g., processor 1705) are functional data structures that impart functionality when employed as part of device 108.

Memory 1710 is capable of storing other program code. Examples of other program code include, but are not limited to, instructions that facilitate communicating with one or more additional devices, one or more computers and/or one or more servers; graphic user interface (GUI) and/or UI processing; sensor-related processing and functions; phone-related processes and functions; electronic-messaging related processes and functions; Web browsing-related processes and functions; media processing-related processes and functions; GPS and navigation-related processes and functions; security functions; and camera-related processes and functions including Web camera and/or Web video functions.

Device 108 further can include a power source (not shown). The power source is capable of providing electrical power to the various elements of device 108. In an embodiment, the power source is implemented as one or more batteries. The batteries may be implemented using any of a variety of known battery technologies whether disposable (e.g., replaceable) or rechargeable. In another embodiment, the power source is configured to obtain electrical power from an external source and provide power (e.g., DC power) to the elements of device. In the case of a rechargeable battery, the power source further may include circuitry that is capable of charging the battery or batteries when coupled to an external power source.

Device 108 is provided for purposes of illustration and not limitation. A device and/or system configured to perform the operations described herein may have a different architecture than illustrated in FIG. 17. The architecture may be a simplified version of the architecture described in connection with FIG. 17 that includes a memory capable of storing instructions and a processor capable of executing instructions. In this regard, device 108 may include fewer components than shown or additional components not illustrated in FIG. 17 depending upon the particular type of device that is implemented. In addition, the particular operating system and/or application(s) included may vary according to device type as may the types of I/O devices included. Further, one or more of the illustrative components may be incorporated into, or otherwise form a portion of, another component. For example, a processor may include at least some memory.

Device 108 may be implemented as a type of data processing system, which may include any of a variety of communication devices or other systems suitable for storing and/or executing program code. Example implementations of device 108 may include, but are not to limited to, a smart phone or other mobile device or phone, a wearable computing device, a computer (e.g., desktop, laptop, or tablet computer), a television or other appliance with a display, a computer system included and/or embedded in another larger system such as an automobile, a virtual reality system, or an augmented reality system.

The terminology used herein is for the purpose of describing particular embodiments only and is not intended to be limiting. Notwithstanding, several definitions that apply throughout this document now will be presented.

As defined herein, the singular forms "a," "an," and "the" are intended to include the plural forms as well, unless the context clearly indicates otherwise.

As defined herein, the terms "at least one," "one or more," and "and/or," are open-ended expressions that are both conjunctive and disjunctive in operation unless explicitly stated otherwise. For example, each of the expressions "at least one of A, B, and C," "at least one of A, B, or C," "one or more of A, B, and C," "one or more of A, B, or C," and "A, B, and/or C" means A alone, B alone, C alone, A and B together, A and C together, B and C together, or A, B and C together.

As defined herein, the term "automatically" means without user intervention.

As defined herein, the term "computer readable storage medium" means a storage medium that contains or stores program code for use by or in connection with an instruction execution system, apparatus, or device. As defined herein, a "computer readable storage medium" is not a transitory, propagating signal per se. A computer readable storage medium may be, but is not limited to, an electronic storage device, a magnetic storage device, an optical storage device, an electromagnetic storage device, a semiconductor storage device, or any suitable combination of the foregoing. The different types of memory, as described herein, are examples of a computer readable storage media. A non-exhaustive list of more specific examples of a computer readable storage medium may include: a portable computer diskette, a hard disk, a random-access memory (RAM), a read-only memory (ROM), an erasable programmable read-only memory (EPROM or Flash memory), a static random-access memory (SRAM), a portable compact disc read-only memory (CD-ROM), a digital versatile disk (DVD), a memory stick, a floppy disk, or the like.

As defined herein, the term "if" means "when" or "upon" or "in response to" or "responsive to," depending upon the context. Thus, the phrase "if it is determined" or "if [a stated condition or event] is detected" may be construed to mean "upon determining" or "in response to determining" or "upon detecting [the stated condition or event]" or "in response to detecting [the stated condition or event]" or "responsive to detecting [the stated condition or event]" depending on the context.

As defined herein, the terms "one embodiment," "an embodiment," "one or more embodiments," or similar language mean that a particular feature, structure, or characteristic described in connection with the embodiment is included in at least one embodiment described within this disclosure. Thus, appearances of the phrases "in one embodiment," "in an embodiment," "in one or more embodiments," and similar language throughout this disclosure may, but do not necessarily, all refer to the same embodiment. The terms "embodiment" and "arrangement" are used interchangeably within this disclosure.

As defined herein, the term "processor" means at least one hardware circuit. The hardware circuit may be configured to carry out instructions contained in program code. The hardware circuit may be an integrated circuit. Examples of a processor include, but are not limited to, a central processing unit (CPU), an array processor, a vector processor, a digital signal processor (DSP), a field-programmable gate array (FPGA), a programmable logic array (PLA), an application specific integrated circuit (ASIC), programmable logic circuitry, Graphics Processing Units (GPUs), Digital Signal Processors (DSPs), and a controller.

As defined herein, the term "real-time" means a level of processing responsiveness that a user or system senses as sufficiently immediate for a particular process or determination to be made, or that enables the processor to keep up with some external process.

As defined herein, the term "responsive to" and similar language as described above, e.g., "if," "when," or "upon," mean responding or reacting readily to an action or event. The response or reaction is performed automatically. Thus, if a second action is performed "responsive to" a first action, there is a causal relationship between an occurrence of the first action and an occurrence of the second action. The term "responsive to" indicates the causal relationship.

The term "substantially" means that the recited characteristic, parameter, or value need not be achieved exactly, but that deviations or variations, including for example, tolerances, measurement error, measurement accuracy limitations, and other factors known to those of skill in the art, may occur in amounts that do not preclude the effect the characteristic was intended to provide.

The terms first, second, etc. may be used herein to describe various elements. These elements should not be limited by these terms, as these terms are only used to distinguish one element from another unless stated otherwise or the context clearly indicates otherwise.

A computer program product may include a computer readable storage medium (or media) having computer readable program instructions thereon for causing a processor to carry out aspects of the disclosed technology. Within this disclosure, the term "program code" is used interchangeably with the term "computer readable program instructions." Computer readable program instructions described herein may be downloaded to respective computing/processing devices from a computer readable storage medium or to an external computer or external storage device via a network, for example, the Internet, a LAN, a WAN and/or a wireless network. The network may include copper transmission cables, optical transmission fibers, wireless transmission, routers, firewalls, switches, gateway computers and/or edge devices including edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations for the inventive arrangements described herein may be assembler instructions, instruction-set-architecture (ISA) instructions, machine instructions, machine dependent instructions, microcode, firmware instructions, or either source code or object code written in any combination of one or more programming languages, including an object-oriented programming language and/or procedural programming languages. Computer readable program instructions may specify state-setting data. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a LAN or a WAN, or the connection may be made to an external computer (for example, through the Internet using an Internet Service Provider). In some cases, electronic circuitry including, for example, programmable logic circuitry, an FPGA, or a PLA may execute the computer readable program instructions by utilizing state information of the computer readable program instructions to personalize the electronic circuitry, in order to perform aspects of the inventive arrangements described herein.

Certain aspects of the inventive arrangements are described herein with reference to flowchart illustrations and/or block diagrams of methods, apparatus (systems), and computer program products. It will be understood that each block of the flowchart illustrations and/or block diagrams, and combinations of blocks in the flowchart illustrations and/or block diagrams, may be implemented by computer readable program instructions, e.g., program code.

These computer readable program instructions may be provided to a processor of a computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. In this way, operatively coupling the processor to program code instructions transforms the machine of the processor into a special-purpose machine for carrying out the instructions of the program code. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the operations specified in the flowchart and/or block diagram block or blocks.

The computer readable program instructions may also be loaded onto a computer, other programmable data processing apparatus, or other device to cause a series of operations to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various aspects of the inventive arrangements. In this regard, each block in the flowcharts or block diagrams may represent a module, segment, or portion of instructions, which comprises one or more executable instructions for implementing the specified operations. In some alternative implementations, the operations noted in the blocks may occur out of the order noted in the figures. For example, two blocks shown in succession may be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, may be implemented by special purpose hardware-based systems that perform the specified functions or acts or carry out combinations of special purpose hardware and computer instructions.

The corresponding structures, materials, acts, and equivalents of all means or step plus function elements that may be found in the claims below are intended to include any structure, material, or act for performing the function in combination with other claimed elements as specifically claimed.

The description of the embodiments provided herein is for purposes of illustration and is not intended to be exhaustive or limited to the form and examples disclosed. The terminology used herein was chosen to explain the principles of the inventive arrangements, the practical application or technical improvement over technologies found in the marketplace, and/or to enable others of ordinary skill in the art to understand the embodiments disclosed herein. Modifications and variations may be apparent to those of ordinary skill in the art without departing from the scope and spirit of the described inventive arrangements. Accordingly, reference should be made to the following claims, rather than to the foregoing disclosure, as indicating the scope of such features and implementations.

What is claimed is:

1. A computer-implemented method of content delivery, the method comprising:
    caching a source content having a plurality of bridge points;
    receiving a user event indicating an interaction with a user, wherein the user event is received during playback of the source content;
    in response to the user event:
        selecting a template from a plurality of cached templates, wherein the template corresponds to a bridge point selected from the plurality of bridge points of the source content as an exit point from the source content;
        dynamically generating a bridge linking the bridge point with the template;
        selecting a target content from a plurality of cached target contents; and
        conveying the bridge, the template, and the target content to a device of the user for playback following the bridge point of the source content.

2. The computer-implemented method of claim 1, further comprising:
    selecting a template segment associated with the template from a plurality of cached template segments;
    wherein the template segment associated with the template links the template with a start of the target content and the template segment is conveyed to the device for playback following the template and before the target content.

3. The computer-implemented method of claim 2, further comprising:
    dynamically generating a further bridge linking the template with a start of the template segment based on a metric indicating an amount of dissimilarity between the template and the start of the template segment exceeding a threshold amount of dissimilarity.

4. The computer-implemented method of claim 1, wherein the template is selected from the plurality of cached templates based on metrics indicating dissimilarity between the bridge point and each template of the plurality of cached templates.

5. The computer-implemented method of claim 4, wherein the template and the bridge point include image frames.

6. The computer-implemented method of claim 4, wherein the template and the bridge point include audio information.

7. The computer-implemented method of claim 4, wherein the template selected from the plurality of cached templates has a metric indicating a lowest dissimilarity.

8. The computer-implemented method of claim 4, wherein a length of the bridge depends on a degree of the dissimilarity between the bridge point and the template.

9. The computer-implemented method of claim 1, wherein the bridge point is a next bridge point in time within the source content from a playback position in the source content at a time of the user event.

10. An apparatus, comprising:
    one or more processors configured to execute operations including:
        caching a source content having a plurality of bridge points;
        receiving a user event indicating an interaction with a user, wherein the user event is received during playback of the source content;
        in response to the user event:
            selecting a template from a plurality of cached templates, wherein the template corresponds to a bridge point selected from the plurality of bridge points of the source content as an exit point from the source content;
            dynamically generating a bridge linking the bridge point with the template;
            selecting a target content from a plurality of cached target contents; and
            conveying the bridge, the template, and the target content to a device of the user for playback following the bridge point of the source content.

11. The apparatus of claim 10, wherein the one or more processors are configured to execute operations including:
    selecting a template segment associated with the template from a plurality of cached template segments;
    wherein the template segment associated with the template links the template with a start of the target content and the template segment is conveyed to the device for playback following the template and before the target content.

12. The apparatus of claim 11, wherein the one or more processors are configured to execute operations including:
    dynamically generating a further bridge linking the template with a start of the template segment based on a metric indicating an amount of dissimilarity between the template and the start of the template segment exceeding a threshold amount of dissimilarity.

13. The apparatus of claim 10, wherein the template is selected from the plurality of cached templates based on metrics indicating dissimilarity between the bridge point and each template of the plurality of cached templates.

14. The apparatus of claim 13, wherein the template and the bridge point include image frames.

15. The apparatus of claim 13, wherein the template and the bridge point include audio information.

16. The apparatus of claim 13, wherein the template selected from the plurality of cached templates has a metric indicating a lowest dissimilarity.

17. The apparatus of claim 13, wherein a length of the bridge depends on a degree of the dissimilarity between the bridge point and the template.

18. The apparatus of claim 10, wherein the bridge point is a next bridge point in time within the source content from a playback position in the source content at a time of the user event.

19. A non-transitory computer program product, comprising:
one or more computer readable storage media, and program instructions collectively stored on the one or more computer readable storage media, wherein the program instructions are executable by computer hardware to perform operations including:
caching a source content having a plurality of bridge points;
receiving a user event indicating an interaction with a user, wherein the user event is received during playback of the source content;
in response to the user event:
selecting a template from a plurality of cached templates, wherein the template corresponds to a bridge point selected from the plurality of bridge points of the source content as an exit point from the source content;
dynamically generating a bridge linking the bridge point with the template;
selecting a target content from a plurality of cached target contents; and
conveying the bridge, the template, and the target content to a device of the user for playback following the bridge point of the source content.

20. The computer program product of claim 19, wherein the template is selected from the plurality of cached templates based on metrics indicating dissimilarity between the bridge point and each template of the plurality of cached templates.

21. An apparatus, comprising:
an input/output interface configured to receive a user event from a device of a user and convey content to the device in response to the user event;
one or more storage devices configured to store a source content including a plurality of bridge points, a plurality of templates, a plurality of target contents, and a plurality of template segments;
a hardware processor including:
a template selector configured to choose a selected template from the plurality of templates based on a selected bridge point chosen from the plurality of bridge points of the source content;
a target content selector configured to choose a selected target content from the plurality of target contents based on the user event; and
a rendering engine configured to dynamically generate a bridge linking the selected bridge point of the source content with the selected template;
wherein the interface is configured to convey the bridge, the selected template, a template segment selected from the plurality of template segments that is associated with the selected template, and the selected target content to the device of the user for playback following the selected bridge point of the source content.

22. The apparatus of claim 21, wherein the template selector is configured to calculate metrics indicating dissimilarity between the selected bridge point and each template of the plurality of templates, and wherein the selected template has a metric indicating a lowest dissimilarity.

23. The apparatus of claim 22, wherein the rendering engine is configured to generate the bridge with a length that depends on a degree of the dissimilarity between the selected bridge point and the selected template as specified by the metric.

24. The apparatus of claim 22, wherein the selected template and the selected bridge point include image frames.

25. The apparatus of claim 22, wherein the selected template and the selected bridge point include audio information.

26. The apparatus of claim 21, wherein the interface implements a state machine having a listening state in which the source content is played continuously in a loop until receipt of the user event and a plurality of response states in which different ones of the plurality of target contents are played based on the user event.

27. The apparatus of claim 21, wherein each template segment of the plurality of template segments has a same end, wherein each target content of the plurality of target contents has a same start, and wherein the same end matches the same start.

* * * * *